(12) United States Patent
Nguyen et al.

(10) Patent No.: US 7,650,164 B2
(45) Date of Patent: Jan. 19, 2010

(54) METHOD AND SYSTEM FOR EXCHANGING DATA BETWEEN A MOBILE PHONE AND A PC

(75) Inventors: Chuong Nguyen, Garden Grove, CA (US); Xiaohua Xie, Irvine, CA (US); Travis Tran, Anaheim, CA (US)

(73) Assignee: Broadcom Corporation, Irvine, CA (US)

( * ) Notice: Subject to any disclaimer, the term of this patent is extended or adjusted under 35 U.S.C. 154(b) by 260 days.

(21) Appl. No.: 11/224,368

(22) Filed: Sep. 12, 2005

(65) Prior Publication Data
US 2006/0094462 A1 May 4, 2006

Related U.S. Application Data

(60) Provisional application No. 60/624,482, filed on Nov. 2, 2004.

(51) Int. Cl.
*H04M 1/00* (2006.01)
(52) U.S. Cl. ............... 455/556.2; 455/41.2; 455/556.1; 455/412.1
(58) Field of Classification Search ............... 455/41.2, 455/556.1, 556.2, 412.1
See application file for complete search history.

(56) References Cited

U.S. PATENT DOCUMENTS

| | | | | |
|---|---|---|---|---|
| 6,049,453 | A * | 4/2000 | Hulsebosch | 361/679.41 |
| 6,633,759 | B1 * | 10/2003 | Kobayashi | 455/419 |
| 6,909,878 | B2 * | 6/2005 | Haller et al. | 455/41.3 |
| 7,095,402 | B2 * | 8/2006 | Kunii et al. | 345/169 |
| 7,165,224 | B2 * | 1/2007 | Pyhalammi | 715/748 |
| 7,200,389 | B2 * | 4/2007 | Date et al. | 455/419 |
| 7,231,204 | B1 * | 6/2007 | Osborn et al. | 455/412.1 |
| 7,280,847 | B2 * | 10/2007 | Goldthwaite et al. | 455/558 |
| 2002/0184004 | A1 * | 12/2002 | Shizuka et al. | 704/200 |
| 2003/0204656 | A1 * | 10/2003 | Ha | 710/301 |
| 2004/0214524 | A1 * | 10/2004 | Noda et al. | 455/41.2 |
| 2007/0197163 | A1 * | 8/2007 | Robertson | 455/26.1 |

OTHER PUBLICATIONS

ESTI TS 101 267 (3GPP TS 11.14), Aug. 2000, GSM 11.14 version 8.3.0 Release 1999, pp. 1-20.*

* cited by examiner

*Primary Examiner*—Matthew D Anderson
*Assistant Examiner*—April S Guzman
(74) *Attorney, Agent, or Firm*—McAndrews, Held & Malloy

(57) ABSTRACT

User information such as address books, calendars, images, ring tones, and the like may be exchanged between a mobile device such as, for example, a mobile phone and a personal computer, using an enhanced or extended version of an AT command set. Client code in the mobile device and application software on the personal computer permit a user to preserve and transfer copies of personal information via a short wired or wireless communication link, permitting the user to make use of such personal information when migrating to a new mobile device, thus avoiding manual re-entry of information, loss of stored images, and re-purchase of previously purchased and downloaded materials.

30 Claims, 10 Drawing Sheets

METHOD AND SYSTEM FOR EXCHANGING DATA BETWEEN A MOBILE PHONE AND A PC

RELATED APPLICATIONS

The present application makes reference to, claims priority to, and claims the benefit of U.S. Provisional Patent Application Ser. No. 60/624,482 entitled "METHOD AND SYSTEM FOR EXCHANGING DATA BETWEEN A MOBILE PHONE AND A PC", filed Nov. 2, 2004, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The mobile phone has become a popular consumer item. A large number of features and functions have been added to the mobile phone beyond its original mobile voice communication capability such as, for example, digital still and video cameras to take still and motion pictures, short message service (SMS) and multimedia messaging service (MMS) capabilities to support text and multimedia messaging, address books, organizer and calendar functionality, call record information and ring tone melodies, to name only a few. As each new function is added, the amount of personal digital data stored in the mobile phone increases. Changing from one mobile handset to another becomes a major undertaking due to the volume of data that must be left behind, or the effort required to transfer the information from the old handset to the new handset. In worst case situations, the user finds themselves re-entering information that could not be electronically transferred.

In some cases, standards and/or software supporting such transfers of information do not exist, may be too intimidating, or may be too difficult for the typical mobile phone user to attempt.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for exchanging data between a mobile phone and a personal computer, substantially as shown in and/or described in connection with at least one of the figures, as set forth more completely in the claims.

These and other advantages, aspects, and novel features of the present invention, as well as details of illustrated embodiments thereof, will be more fully understood from the following description and drawings.

DETAILED DESCRIPTION OF THE INVENTION

Aspects of the present invention relate to the management of personal multimedia information used in a portable electronic device. More specifically, aspects of the present invention relate to a flexible mechanism supporting the exchange of digital information such as telephone and address books, calendar information, ring tones and melodies, pictures, video information, voice records, phone settings, and the like between a personal computer and handheld electronic device such as, for example, a mobile station (e.g., a cellular phone or multimedia handset), a pager, and a personal digital assistant.

A protocol in accordance with a representative embodiment of the present invention is uniquely designed to work on a real or any emulated serial interface such as, for example, a physical communication media, a data cable (RS232 or USB), an IrDA link, or a Bluetooth link. The command set of a representative embodiment of the present invention may be implemented as extended AT commands compliant with European Telecommunication Standards Institute (ETSI) TS 100 916 v7.5.0 (1999-12) Technical Specification entitled "Digital cellular telecommunications system (Phase 2+) AT Command set for GSM Mobile Equipment (ME) (GSM 07.07 version 7.5.0 Release 1998)", the complete subject matter of which is hereby incorporated herein by reference, in its entirety. A representative embodiment of the present invention may support many existing AT commands. Representative embodiments of the present invention provide a cost effective solution that supports all serial, IrDA, and Bluetooth links, when compared to other approaches that may require additional software components such as, for example, the complexity and expense of SyncML or OBEX (object exchange) protocol support.

Figure 1A:
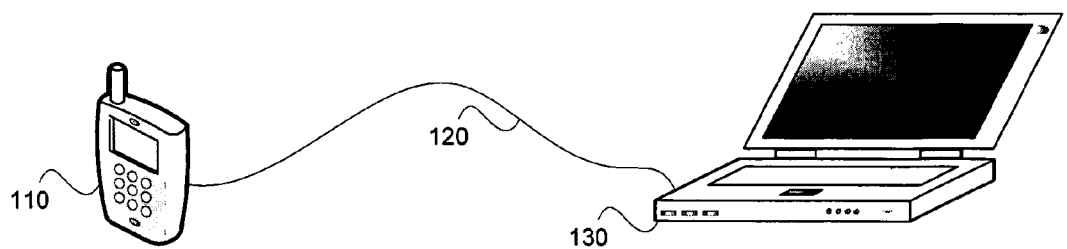
FIG. 1A shows a block diagram of a exemplary data exchange arrangement supporting exchange of data between a mobile station and a personal computer (PC) via a communication link, in which a representative embodiment of the present invention may be practiced.

The following discussion of various representative embodiments of the present invention may make reference to the following acronyms and definitions of terms:

DTE—Data Terminal Equipment
DCE—Data Circuit Terminating Equipment
DTR—Data Terminal Ready. Signal defined in a DTE-DCE interface.
ATC—AT command to MS
GSM—Global System for Mobile communication
MS—Mobile Station
SMS—Short Message Services
SIM—Subscriber Identity Module
SI—System Interface
SW—Software
TA—Terminal Adapter
TAE—Terminal Adapter Equipment
TE—Terminal Equipment FIG. 1A shows a block diagram of a exemplary data exchange arrangement 100 supporting exchange of data between a mobile station 110 and a personal computer (PC) 130 via a communication link 120, in which a representative embodiment of the present invention may be practiced. The mobile station 110 may, for example, comprise a mobile handset, cellular telephone, and/or mobile multimedia handset, while the PC 130 may, for example, comprise any of a laptop PC, a desktop PC, and/or other computing platform capable of running user applications and communicating with the mobile station 110. The communication link may provide a bidirectional path between the mobile station 110 and PC 130, and may comprise a serial direct connection, or may employ a wireless link such as, for example, an infrared (e.g., IrDA) and/or radio frequency (e.g., Bluetooth, WiFi) interface. In representative embodiments of the present invention, the communication link may employ a data communication interface of the handheld electronic device (e.g., the mobile station 110) that is a secondary communication path of device, and that is normally used for maintenance, provisioning, and data communication not directly related to the primary function of the handheld electronic device.

Figure 1B:
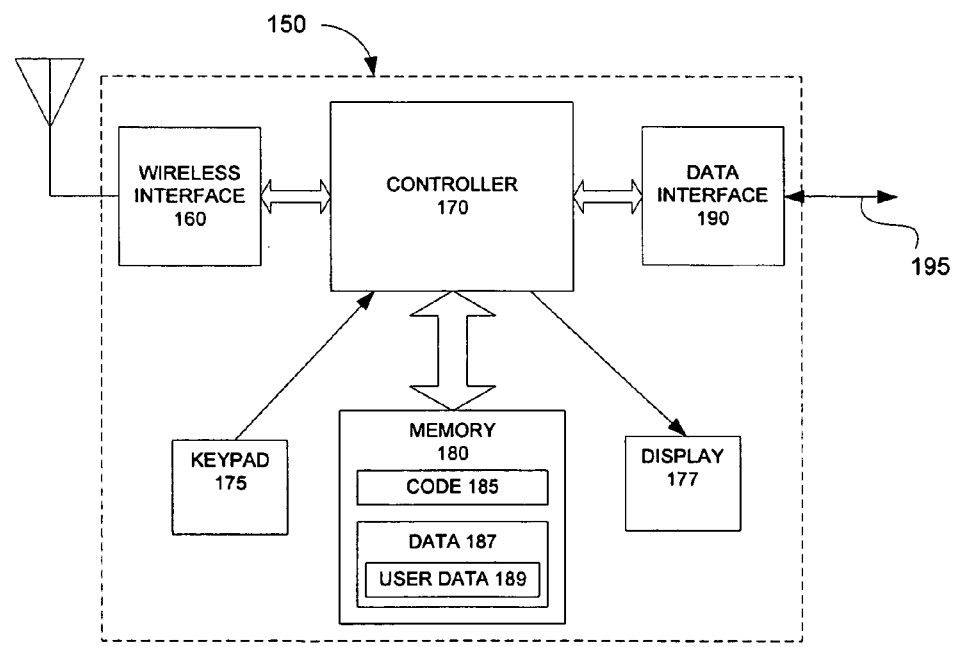
FIG. 1B shows a block diagram of the elements of an exemplary mobile station that may correspond to, for example, the mobile station of FIG. 1A, in accordance with a representative embodiment of the present invention.

FIG. 1B shows a block diagram of the elements of an exemplary mobile station 150 that may correspond to, for example, the mobile station 110 of FIG. 1A, in accordance with a representative embodiment of the present invention.

The mobile station 150 comprises a controller 170 communicatively coupled to memory 180, to a wireless interface 160 compatible with a serving wireless wide area communication network, and a data interface 190 for communication with a device such as, for example, a PC like the PC 130 of FIG. 1A, via a wired or wireless communication such as those previously described. In addition, the mobile station 150 of FIG. 1B comprises a keypad 175 for accepting user input, and a display 177 for providing user feedback. As shown in FIG. 1B, the memory 180 comprises code 185 for operating the mobile station 150, and data 187 for storing variables and parameters used during the operation of the mobile station 150. A portion of the data 187 may be characterized as user data 189, that may comprise information that may be associated with the user of the mobile station 150. Such information may comprise text or multimedia messages, address book information, organizer or calendar information, call records, user-selected ring tones, to name just a few.

Additional elements may also be present in the mobile station 150 such as, for example, additional processors for speech processing, audio circuitry for converting sound to/from electrical signals, to name just a few. These additional elements, which are not pertinent to the following discussion, are not shown here for reasons of clarity.

Figure 2:
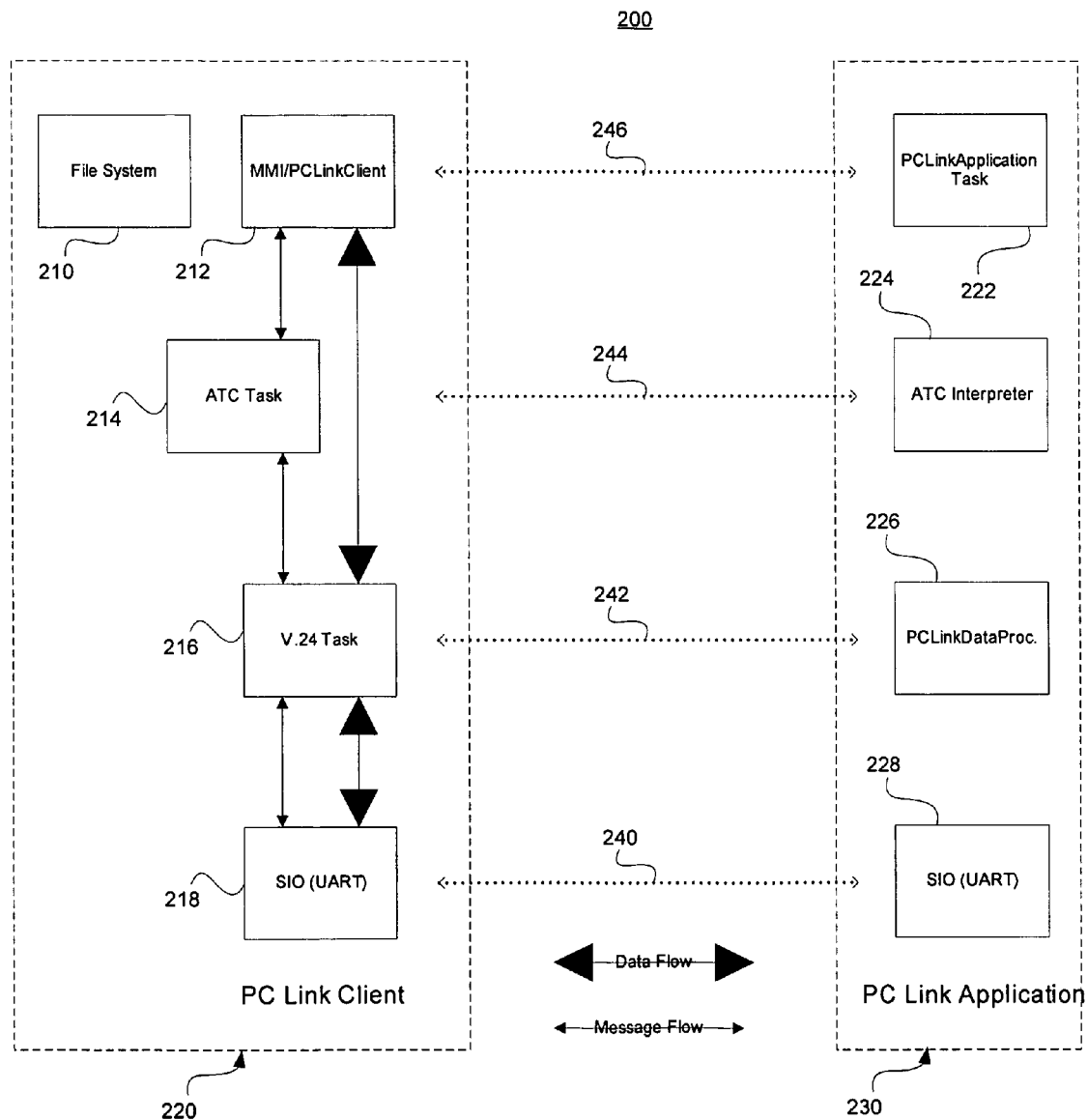
FIG. 2 shows an exemplary data flow diagram illustrating data flow between elements of a mobile station such as, for example, the mobile station of FIG. 1A, and a PC such as, for example, the PC of FIG. 1A, for a system supporting the exchange of data, in accordance with a representative embodiment of the present invention.

FIG. 2 shows an exemplary data flow diagram 200 illustrating data flow between elements of a mobile station 220 such as, for example, the mobile station 110 of FIG. 1A, and a PC such as, for example, the PC 130 of FIG. 1A, for a system supporting the exchange of data, in accordance with a representative embodiment of the present invention. The elements of the mobile station 220 of FIG. 2 comprise a file system 210, a man-machine interface (MMI)/PCLinkClient code 212, an AT command (ATC) task 214, a V.24 task 216, and a serial input/output (SIO) universal asynchronous receiver transmitter (UART) 218. The man-machine interface MMI/PCLinkClient code 212, AT command (ATC) task 214, V.24 task 216, and serial input/output (SIO) universal asynchronous receiver transmitter (UART) 218 communicate via logical links 246, 244, and 242 or physically via link 240 with corresponding elements of the PC 230 of FIG. 2 that comprise a PCLINKApplication Task 222, an ATC Interpreter 224, a PCLinkData process 226, and a SIO (UART) 228, respectively. Although the illustration of FIG. 2 shows a particular division of functionality into the elements shown, an embodiment of the present invention is not specifically limited to the arrangement shown, as other arrangements may be employed without departing from the spirit and scope of the present invention.

In a representative embodiment in accordance with the present invention, client software MMI/PCLinkClient 212 may be a module in a man-machine interface (MMI) task of a device such as, for example, a mobile phone or mobile handset like the mobile station (MS) 110 of FIG. 1A. The client software may interface to the rest of the mobile phone (e.g., MS 110) software system by means of interfaces defined for a MMI. In one representative embodiment of the present invention, the interface may be limited to a AT command interpreter (ATC) and a file system such as, for example, the ATC Task 216 and file system 210 of FIG. 2. In a representative embodiment of the present invention, the interface to the file system 210 may use an interface such as that used, for example, in the handling of multimedia message service (MMS) messaging. In such a representative embodiment of the present invention, the following additional functional interfaces may be used to support mobile station to personal computer data exchange features.

In a representative embodiment of the present invention, a task to process elements of an AT command set (e.g., an AT command interpreter such as the ATC Interpreter 224 of FIG. 2) may support the following AT commands, that may provide functionality beyond that supported by the command set specified in (ETSI) TS 100 916 v7.5.0 (1999-12), referenced above:

IPIC
    DPIC
    UPIC
    DELP
    IMEL
    DMEL
    UMEL
    DELM
    PLCK

A representative embodiment of the present invention may also support the following callback functions to the AT command interpreter task (e.g., the ATC Interpreter 224 of FIG. 2), for the above AT commands:

CALLBACK(atc_IPIC_CB)
    CALLBACK(atc_DPIC_CB)
    CALLBACK(atc_UPIC_CB)
    CALLBACK(atc_DELP_CB)
    CALLBACK(atc_IMEL_CB)
    CALLBACK(atc_DMEL_CB)
    CALLBACK(atc_UMEL_CB)
    CALLBACK(atc_DELM_CB)
    CALLBACK(atc_PLCK_CB)

In a representative embodiment of the present invention, responses to, for example, a personal computer application such as, for example, the PCLinkApplication Task 222 of FIG. 2 may be communicated via a function call such as, for example:

atc_CmdRsp(error)

where "error" may be one of ATC_OK_RSP, ATC_CME_ERR_RSP. Other error definitions are also contemplated.

In a representative embodiment of the present invention, a function call such as, for example:

atc_UnsolicitedCmdRspStr(uint8 *buffer)

may be used for unsolicited command responses.

In a representative embodiment of the present invention, an AT command interpreter such as, for example, the ATC Interpreter 224 may communicate with, for example, a man-machine interface (MMI) via a message queue. Entries in the message queue may include, for example, a message type and a pointer to the message. An exemplary message for entry in the message queue is shown below:

```
typedef    struct
{
    MmiMsgID_t       msgID;
    union
    {
        ...
        PCLinkClientMsg_t *p_pclinkmsg;
    }
} MmiMsg_t;
```

In a representative embodiment of the present invention, one or more new message identifiers (IDs) may be defined to support mobile station (e.g., mobile phone) client software.

In a representative embodiment of the present invention, a man-machine interface (MMI) task of the client software such as, for example, the MMI/PCLinkClient code 212 of FIG. 2 may, for example, support the following messages in an AT command interpreter to support new AT commands:

MMI_PCLink_Start_msg
    MMI_PCLink_Stop_msg
    MMI_PCLink_IPIC_msg
    MMI_PCLink_DPIC_msg
    MMI_PCLink_UPIC_msg
    MMI_PCLink_DELP_msg
    MMI_PCLink_IMEL_msg
    MMI_PCLink_DMEL_msg
    MMI_PCLink_UMEL_msg
    MMI_PCLink_DELM_msg
    MMI_PCLink_PLCK_msg In a representative embodiment of the present invention, message typedefs may be defined that correspond to parameters of the above-defined AT commands.

A representative embodiment of the present invention may, for example, support binary mode transfer. The binary mode transfer may be initiated from, for example, the mobile station (e.g., mobile phone) 220 client software upon receipt of download or upload command from a personal computer application through an AT command interpreter.

In a representative embodiment of the present invention, a MMI of mobile station client software such as MMI/PCLinkClient code 212, for example, may receive the following messages from the AT command interpreter (e.g., PCLinkApplication Task 222) to switch between binary transfer mode and ATC mode. The messages with Rsp at the end may represent a response from internal calls to driver software:

MMI_PCLink_BinaryModeChange_msg
    MMI_PCLink_BinaryModeChangeRsp_msg
    MMI_PCLink_ATCModeChange_msg
    MMI_PCLink_ATCModeChangeRsp_msg In a representative embodiment of the present invention, a complete binary data packet may, for example, be sent to a MMI (e.g., MMI/PCLinkClient code 212) of mobile station client software via the following messages:

MMI_PCLINK_BinaryData_msg
    MMI_PCLINK_BinaryDataRsp_msg

In a representative embodiment of the present invention, a MMI (e.g., MMI/PCLinkClient code 212) of a mobile station client software may, for example, effect a binary mode change by calling the following function:

void PCLink_BinaryModeChange(void)

In a representative embodiment of the present invention, the above function may be called to change the AT mode to binary mode. After changing the mode, a message that may be represented as, for example, MMI_PCLink_BinaryModeChangeRsp_msg may be sent to a mobile station MMI client software (e.g., MMI/PCLinkClient code 212) for a response. In a representative embodiment of the present invention, a response may be TRUE or FALSE.

In a representative embodiment of the present invention, the following function may be called to write binary data to the personal computer application after changing to BinaryMode:

void PCLINK_BinaryModeWrite(uint8 *buff, uint16, length)

After writing the data, a message that may be represented as, for example, MMI_PCLINK_BinaryDataRsp_msg may be sent to the mobile station MMI client software (e.g., MMI/PCLinkClient code 212) for a response. In a representative embodiment of the present invention, a response may be TRUE or FALSE.

In a representative embodiment of the present invention, the following function may be called to change from binary mode to ATC mode:

void PCLink_ATCModeChange(void)

After changing the mode, a message that may be represented as, for example, MMI_PCLink_ATCModeChangeRsp_msg may be sent to the mobile station MMI client software (e.g., MMI/PCLinkClient code 212) for a response. In a representative embodiment of the present invention, a response can be TRUE or FALSE.

A representative embodiment of the present invention may support cyclic redundancy check (CRC) checksums for use in error control of messages exchanged between the mobile station client (e.g., MMI/PCLinkClient code 212) and the personal computer application (e.g., PCLinkApplication Task 222). There may, for example, be 16-bit checksums for every packet of data, and a 16-bit checksum for the whole file which is being transferred. The file CRC checksum may be a running checksum of all the packet data that the file comprises. The CRC checksum may be calculated according to the algorithm that follows. The CRC calculation described below may be based on 16-bit words passed as indicated, and may be referred to as a CRC-16 checksum. This CRC is calculated as $X^{16}+X^{15}+X^2+1$ and may protect $2^{16}$ bits or 8192 bytes against single bit errors.

In a representative embodiment of the present invention, the CRC-16 algorithm, like the CRC-CCIT, may be implemented using, for example, a table lookup strategy. By examining the table value, the CRC-16 may operate quickly. Sample "C" language code for determination of the CRC-16 value is given below.

```
//***********Copyright 2001 Mobilink Telecom, Inc. ********************
//
// Description: This file implements CRC16 generation. It is found that the
//              fastest way (using the look-up-table directly) uses about 14 ms
//              for a block of 8K data; the second fast way (using the
//              look-up-table in a function) uses about 26 ms; the slowest way
//              (direct calculation) uses about 150 ms.
//
// $RCSfile: crc.c $
// $Revision: 1.1 $
// $Date: 2001/03/09 17:59:56 $
// $Author: xiao $
//
//************************* History **************************************
//
// $Log: crc.c $
// Revision 1.1 2001/03/09 17:59:56 xiao
// Initial revision
//
//*************************************************************************
#include "crc.h"
#define POLY_MASK 0xA001      // reverse of 8005 (x^16 + x^15 + x^2 + 1)
#ifdef _CRC16_GENERATE_TABLE_
#undef _CRC16_USE_TABLE_
#endif
#ifndef _CRC16_NOT_USE_TABLE_
static const UInt16 crctbl[ ] =
{
        0x0000, 0xc0c1, 0xc181, 0x0140, 0xc301, 0x03c0, 0x0280, 0xc241,
        0xc601, 0x06c0, 0x0780, 0xc741, 0x0500, 0xc5c1, 0xc481, 0x0440,
        0xcc01, 0x0cc0, 0x0d80, 0xcd41, 0x0f00, 0xcfc1, 0xce81, 0x0e40,
        0x0a00, 0xcac1, 0xcb81, 0x0b40, 0xc901, 0x09c0, 0x0880, 0xc841,
        0xd801, 0x18c0, 0x1980, 0xd941, 0x1b00, 0xdbc1, 0xda81, 0x1a40,
        0x1e00, 0xdec1, 0xdf81, 0x1f40, 0xdd01, 0x1dc0, 0x1c80, 0xdc41,
        0x1400, 0xd4c1, 0xd581, 0x1540, 0xd701, 0x17c0, 0x1680, 0xd641,
        0xd201, 0x12c0, 0x1380, 0xd341, 0x1100, 0xd1c1, 0xd081, 0x1040,
        0xf001, 0x30c0, 0x3180, 0xf141, 0x3300, 0xf3c1, 0xf281, 0x3240,
        0x3600, 0xf6c1, 0xf781, 0x3740, 0xf501, 0x35c0, 0x3480, 0xf441,
        0x3c00, 0xfcc1, 0xfd81, 0x3d40, 0xff01, 0x3fc0, 0x3e80, 0xfe41,
        0xfa01, 0x3ac0, 0x3b80, 0xfb41, 0x3900, 0xf9c1, 0xf881, 0x3840,
        0x2800, 0xe8c1, 0xe981, 0x2940, 0xeb01, 0x2bc0, 0x2a80, 0xea41,
        0xee01, 0x2ec0, 0x2f80, 0xef41, 0x2d00, 0xedc1, 0xec81, 0x2c40,
        0xe401, 0x24c0, 0x2580, 0xe541, 0x2700, 0xe7c1, 0xe681, 0x2640,
        0x2200, 0xe2c1, 0xe381, 0x2340, 0xe101, 0x21c0, 0x2080, 0xe041,
        0xa001, 0x60c0, 0x6180, 0xa141, 0x6300, 0xa3c1, 0xa281, 0x6240,
        0x6600, 0xa6c1, 0xa781, 0x6740, 0xa501, 0x65c0, 0x6480, 0xa441,
        0x6c00, 0xacc1, 0xad81, 0x6d40, 0xaf01, 0x6fc0, 0x6e80, 0xae41,
        0xaa01, 0x6ac0, 0x6b80, 0xab41, 0x6900, 0xa9c1, 0xa881, 0x6840,
        0x7800, 0xb8c1, 0xb981, 0x7940, 0xbb01, 0x7bc0, 0x7a80, 0xba41,
        0xbe01, 0x7ec0, 0x7f80, 0xbf41, 0x7d00, 0xbdc1, 0xbc81, 0x7c40,
        0xb401, 0x74c0, 0x7580, 0xb541, 0x7700, 0xb7c1, 0xb681, 0x7640,
        0x7200, 0xb2c1, 0xb381, 0x7340, 0xb101, 0x71c0, 0x7080, 0xb041,
        0x5000, 0x90c1, 0x9181, 0x5140, 0x9301, 0x53c0, 0x5280, 0x9241,
        0x9601, 0x56c0, 0x5780, 0x9741, 0x5500, 0x95c1, 0x9481, 0x5440,
        0x9c01, 0x5cc0, 0x5d80, 0x9d41, 0x5f00, 0x9fc1, 0x9e81, 0x5e40,
        0x5a00, 0x9ac1, 0x9b81, 0x5b40, 0x9901, 0x59c0, 0x5880, 0x9841,
        0x8801, 0x48c0, 0x4980, 0x8941, 0x4b00, 0x8bc1, 0x8a81, 0x4a40,
        0x4e00, 0x8ec1, 0x8f81, 0x4f40, 0x8d01, 0x4dc0, 0x4c80, 0x8c41,
```

```
        0x4400, 0x84c1, 0x8581, 0x4540, 0x8701, 0x47c0, 0x4680, 0x8641,
        0x8201, 0x42c0, 0x4380, 0x8341, 0x4100, 0x81c1, 0x8081, 0x4040
};
#endif
#ifndef __CRC16__CALCULATION__USE__FUNCTION__
#defineCRC16__CalculateEntry(crc, num) (((crc) >> 8) ^ crctbl[((crc) ^ (num)) & 0xff])
#else
//****************************************************************************
//
// Function Name:    CRC16__CalculateEntry
//
// Description: Calculate the crc for a byte pattern
//
// Notes:
//
//****************************************************************************
static UInt32 CRC16__CalculateEntry(UInt32 crc, UInt8 num)
{
#ifndef __CRC16__NOT__USE__TABLE__
        return ((crc >> 8) ^ crctbl[(crc ^ num) & 0xff]);
#else
        UInt8 i;
        for (i = 0; i < 8; i++)
        {
                if ((crc ^ num) & 1)
                {
                        crc = (crc >> 1) ^ POLY__MASK;
                }
                else
                {
                        crc >>= 1;
                }
                num >>= 1;
        }
        return (crc);
#endif
}
#endif
//****************************************************************************
//
// Function Name:    CRC16__CalculateCRC
//
// Description: Calculate the crc for a block of bytes
//
// Notes:
//
//****************************************************************************
UInt32 CRC16__CalculateCRC(UInt32 crc, UInt8 * block, UInt32 sizeBlock)
{
        UInt8 * pt = block;
        UInt8 * last = block + sizeBlock;
        while (pt < last)
        {
                crc = CRC16__CalculateEntry(crc, *pt++);
        }
        return (crc);
}
```

In a representative embodiment of the present invention, there may be many interfaces to a file system already defined in a system such as, for example, the file system 210 of FIG. 2. In a representative embodiment of the present invention, there may be a desire to support multimedia messaging service (MMS) melodies and images. In a representative embodiment of the present invention, an interface to a file system such as, for example, the file system 210 of FIG. 2 may employ the exemplary MM_Store interface shown below.

```
#define MMSTORE__MAX__NAME__LEN 8
typedef enum {
        MMSTORE__WBMP,
        MMSTORE__GIF,
        MMSTORE__JPEG,
        MMSTORE__MELODY,
        MMSTORE__EMELODY,
        MMSTORE__MIDI,
        MMSTORE__WAV,
        MMSTORE__AMR,
        MMSTORE__PNG
} MMStoreType__t;
typedef char MMStoreName__t[MMSTORE__MAX__NAME__LEN + 1];
typedef char* MMStoreName__Ptr;
typedef char** MMStoreName__PtrPtr;
typedef UInt8*       MMStoreDataStream__t;
Boolean MMStore__Init(void);
void MMStore__DeInit(void);
typedef void ( *MMIStore__StoreItCB )( MMStoreName__t name,
```

-continued

```
MMStoreType_t type, Boolean status );
Boolean  MMStore_StoreIt(  MMStoreName_t  name,
MMStoreType_t  type, MMStoreDataStream_t data, UInt16 len,
MMIStore_StoreItCB cb );
Boolean MMStore_DeleteIt( MMStoreName_t name,
MMStoreType_t type );
Boolean  MMStore_RetrieveIt(  MMStoreName_t  name,
MMStoreType_t  type, MMStoreDataStream_t* data, UInt16* len );
Boolean MMStoreGetFileSize(CHAR* fileName, UInt16* size);
```

In a representative embodiment of the present invention, it may be desirable to support authentication of the use of mobile station client and personal computer application software such as, for example, that employed in the MS 110 and the PC 130 of FIG. 1, that may correspond to the elements of FIG. 2. In a representative embodiment of the present invention, an impostor may have physical access to the mobile station 110 (e.g., mobile phone). Because the link (e.g., the communication link 120 of FIG. 1) between a mobile handset (e.g., the MS 110, a mobile phone) and a personal computer (e.g., the PC 130, a laptop) may be via a wire of a few feet in length, a representative embodiment of the present invention may, for example, establish a level of security for accessing secure data no less than that provided when using the mobile station (e.g., mobile phone) itself. In a representative embodiment of the present invention, a simple password login may, for example, be used. For example, the lock code or optional subscriber identity module (SIM) lock code of the mobile phone may be used for the password login, as this provides the same level of security that the mobile phone user intended to have on the mobile phone itself.

Figure 3:
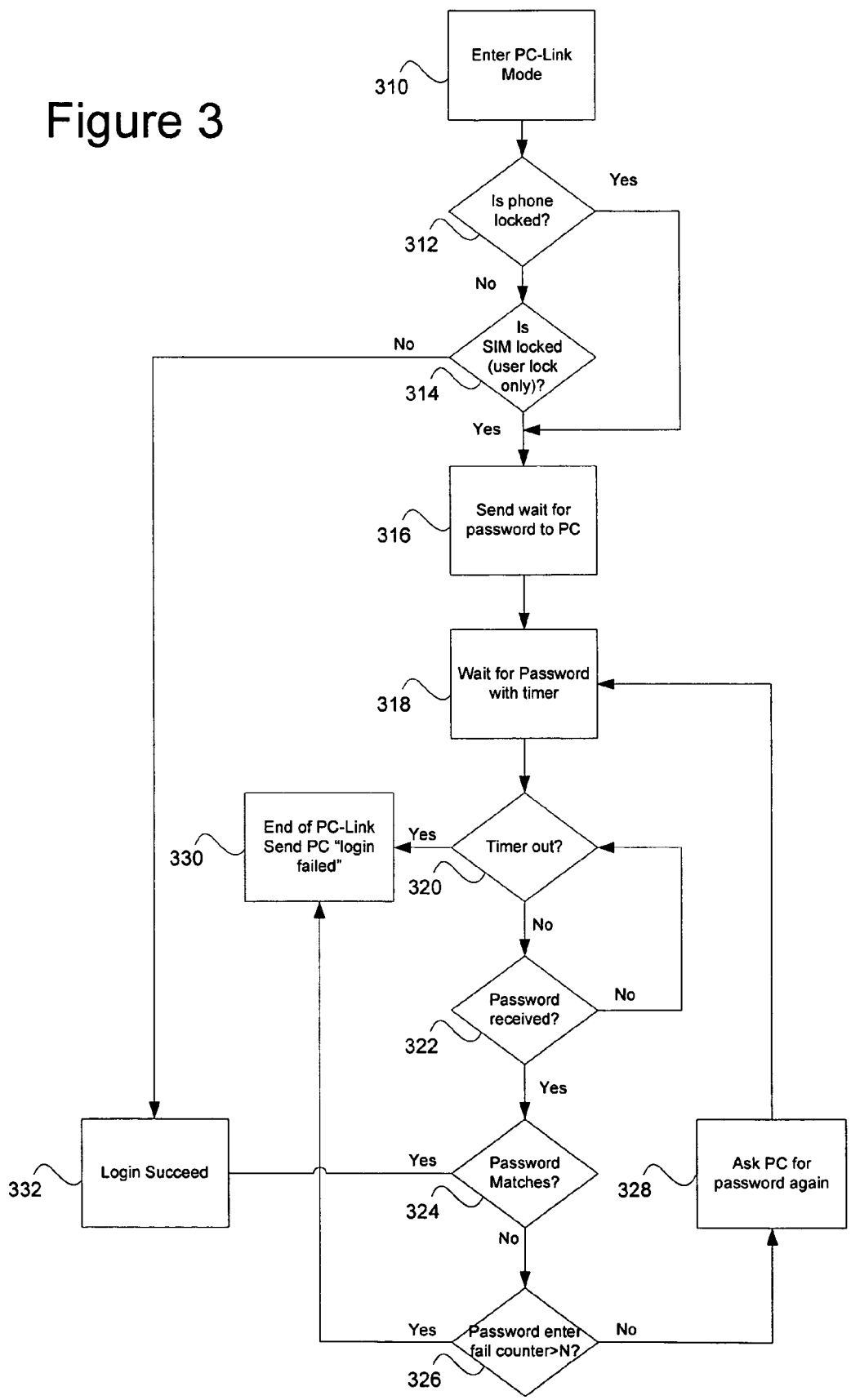
FIG. 3 shows a flowchart of an exemplary method of performing client authentication, in accordance with a representative embodiment of the present invention.

FIG. 3 shows a flowchart of an exemplary method of performing client authentication, in accordance with a representative embodiment of the present invention. In order to accomplish the above method, an AT command interpreter (ATC) such as, for example, the ATC Interpreter 224 of FIG. 2 may, for example, support the following commands:

```
AT+PLCK=<LockType>,"password"
Where <LockType> may range from 0-3.
  0: phone lock
  1: SIM lock (PIN1)
  2: SIM lock (PIN2)
  3: SIM lock (PUK)
``` and "password" may be a lock code as an ASCII sequence of characters. In a representative embodiment of the present invention, the display (e.g., the display 177 of FIG. 1) may, upon entry of the lock code, hide the lock code (e.g., by displaying "******").

In a representative embodiment of the present invention, the exemplary method of FIG. 3 may proceed as follows. A mobile handset (e.g., the MS 110 of FIG. 1) and a personal computer (e.g., the PC 130 of FIG. 1) may be interconnected by a communication link (e.g., the communication link 120 of FIG. 1), and may enter PC-Link mode (block 310). A software application on the personal computer (PC) (e.g., the PCLinkApplication Task 222 of the PC 230 of FIG. 2) may establish communication with a client code (e.g., the MMI/PCLinkClient code 212 of the MS 220 of FIG. 2). The software application on the PC (e.g., the PCLinkApplication Task 222) may make a determination of whether the mobile handset (e.g., the MS 220 of FIG. 1) is locked, by sending to the mobile handset an AT command such as, for example, "AT+CFUN=2". Upon receiving the AT command "AT+CFUN=2", the mobile handset (e.g., the ATC Task 214 in the MS 220) may check whether the mobile handset is locked (block 312). If the mobile handset is locked, the mobile handset may send an unsolicited command to the personal computer such as, for example, "PLCK:0", to request the phone-lock code, or, "PLCK:1", to request the simlock code (PIN1), or "PLCK:2" to request PIN2, or "PLCK:3" to request the PUK (block 316). The mobile handset (e.g., the MS 220) may then activate a timer, and may begin a loop waiting for the password information from the personal computer (block 318). As part of the loop, the mobile handset (e.g., the MS 220) may periodically check whether the timer has timed out (block 320). The personal computer (e.g., PC 230) may, for example, use the AT command 'AT+PLCK=0-2,"password"' to send the appropriate passwords or code to the mobile handset. If the timer has not timed out, the mobile handset may determine whether the requested password was received (block 322). If the password has not been received, the mobile handset (e.g., MS 220) may loop back to again determine the state of the timer (block 320). If the timer has timed out (block 320), the method of FIG. 3 ends, following the sending to the personal computer of an indication that the login failed (block 330).

If, however, the password is received (block 322), the mobile handset may determine whether the received password matches a valid password (block 324). If the password matches a valid password, the login succeeds (block 332). The mobile handset may, for example, respond to the personal computer with a string of characters or other representation of 'OK', if the password is correct. If, however, it is determined that the password does not match, the mobile handset may determine whether a received password has failed to match a valid password more than a predetermined number of times N (block 326). If the number of password failures does not exceed the predetermined number N, a request for the password may again be sent to the personal computer (block 328). The mobile handset may send an unsolicited command such as, for example, "PLCK:X" back to the personal computer to request passwords, where X may be 0, 1, or 2. The mobile handset may then re-activate the timer and loop while waiting for a valid password (block 318). If the number of password failures does exceed the predetermined number, the method of FIG. 3 ends, following the sending to the personal computer of an indication that the login failed (block 330), as described above.

Figure 4:
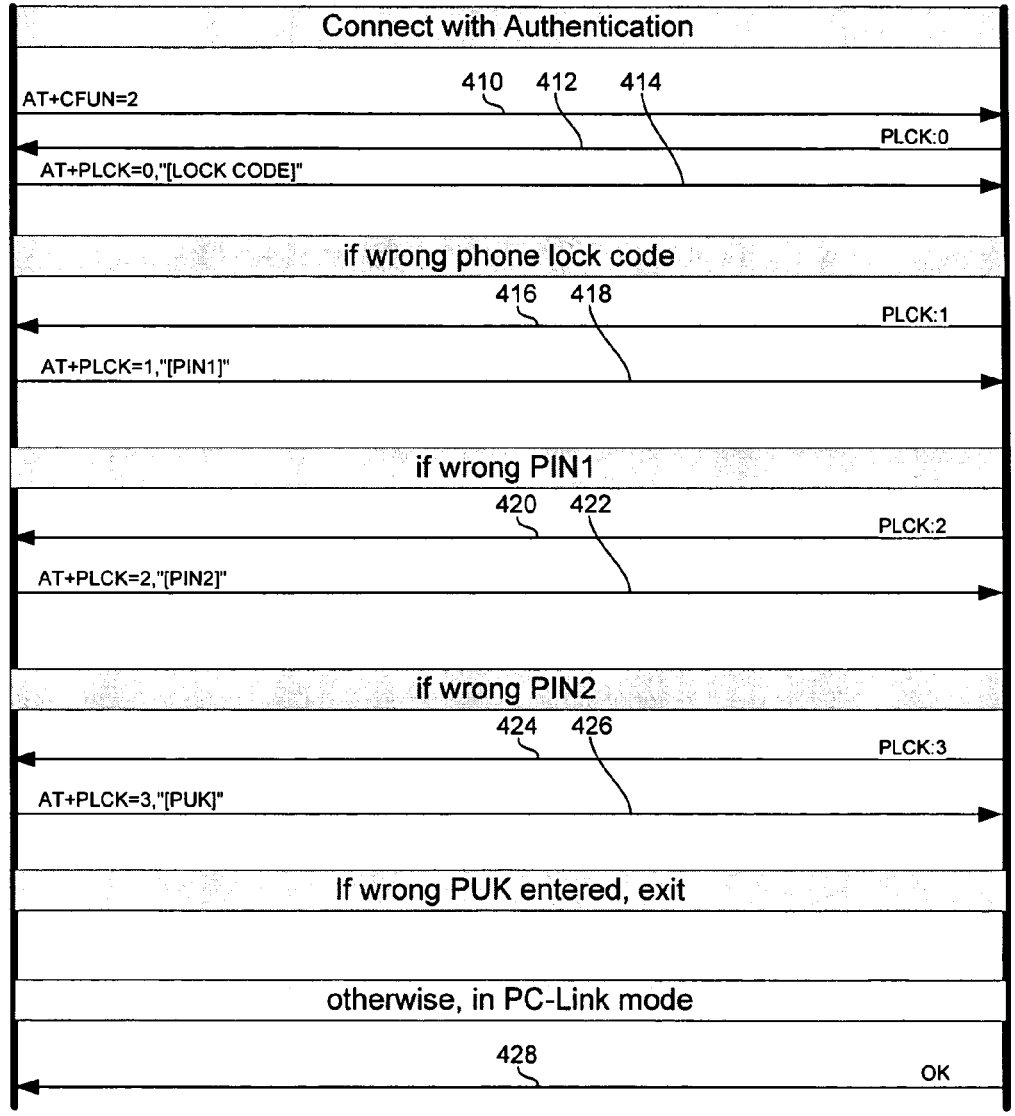
FIG. 4 shows a message exchange diagram of an exemplary authentication procedure such as that illustrated in the flowchart of FIG. 3, between a mobile station and a personal computer that may correspond to, for example, the mobile station and the PC, respectively, of FIG. 1A, in accordance with a representative embodiment of the present invention.

FIG. 4 shows a message exchange diagram of an exemplary authentication procedure such as that illustrated in the flowchart of FIG. 3, between a mobile station and a personal computer that may correspond to, for example, the mobile station 110 and the PC 130, respectively, of FIG. 1A, in accordance with a representative embodiment of the present invention. The diagram of FIG. 4 shows a vertical bar on the left representing a PC-Link Application 402 that may correspond to, for example, the PCLINKApplication Task 222 running on the PC 230 of FIG. 2. The vertical bar on the right of FIG. 4 represents a PC-LINK Client 404 application that may correspond to, for example, the MMI/PCLinkClient 212 running on the MS 220 of FIG. 2. Following establishment of a communication path between the mobile station (e.g., MS 220) and the PC (e.g., PC 230), the PC-Link Application 402 may send a message 410 containing an AT command such as, for example, "AT+CFUN=2", to the PC-Link Client 404, to determine whether the mobile station is locked.

If the mobile handset is locked, the PC-Link Client 404 in the mobile handset may, for example, respond by sending a message 412 containing an unsolicited command "PLCK:0" to the PC-Link Application 402 in the PC. The PC-Link Application 402 may then respond by sending a message 414 containing an AT command "AT+PLCK=0,'[LOCK CODE]'" to the PC-Link Client 404. If the received '[LOCK CODE]' is correct, the PC-Link Client 404 may respond with a message 428 representing an 'OK' response that signifies authentication is complete, and the PC-Link Application 402 and PC-Link Client may enter PC-Link mode.

If, however, the received '[LOCK CODE]' is incorrect, the PC-Link Client 404 may respond with a message 416 containing an unsolicited command "PLCK:1", requesting a PIN1 value. In response, the PC-Link Application 402 may then send a message 418 containing an AT command "AT+PLCK=1,'[PIN1]'" to the PC-Link Client 404. If the received '[PIN1]' is correct, the PC-Link Client 404 may respond with a message 428 representing an 'OK' response that signifies authentication is complete, and the PC-Link Application 402 and PC-Link Client 404 may enter PC-Link mode.

If, however, the received '[PIN1]' is incorrect, the PC-Link Client 404 may respond with a message 420 containing an unsolicited command "PLCK:2", requesting a PIN2 value. The PC-Link Application 402 may then send a message 422 containing an AT command "AT+PLCK=2,'[PIN2]'" to the PC-Link Client 404. If the received '[PIN2]' is correct, the PC-Link Client 404 may respond with a message 428 representing an 'OK' response that signifies authentication is complete, and the PC-Link Application 402 and PC-Link Client 404 may enter PC-Link mode.

If, however, the received '[PIN2]' is incorrect, the PC-Link Client 404 may respond with a message 424 containing an unsolicited command "PLCK:3", requesting a PUK value. The PC-Link Application 402 may then send a message 426 containing an AT command "AT+PLCK=3,'[PUK]'" to the PC-Link Client 404. If the received '[PUK]' is correct, the PC-Link Client 404 may respond with a message 428 representing an 'OK' response that signifies authentication is complete, and the PC-Link Application 402 and PC-Link Client 404 may enter PC-Link mode.

If, however, the received '[PUK]' is incorrect, the PC-Link Client 404 may exit the authentication procedure without permitting access to the mobile station, and may, for example, leave a subscriber identity module of a user of the mobile station locked. This may require the user of the mobile station to seek the assistance of the vendor of the mobile station or the provider of a wireless communication service.

A PC application such as, for example, the PC-Link Application Task 222 of FIG. 2 may, for example, have graphical user interface (GUI) windows for the user to download and upload files such as picture and sound files to and from a mobile phone such as the MS 110 of FIG. 1A.

In a representative embodiment of the present invention, files may be downloaded from the personal computer (PC) to the mobile phone based on, for example, a file name. Existing files in the mobile phone with the same names may be overwritten. An application in accordance with a representative embodiment of the present invention may, for example, have a graphical user interface (GUI) window for a user to download files. Other interfaces may also be employed without departing from the spirit and scope of the present invention. The GUI window may have the following elements:

1. A list of folders on the personal computer PC. A user may navigate this list and select the folder containing the files to download.
2. A list of files contained in the selected folder. A user may select a single file or multiple files to download.
3. A button the user may click to download the selected files.
4. A window to show the status of the download process.

Figure 5:
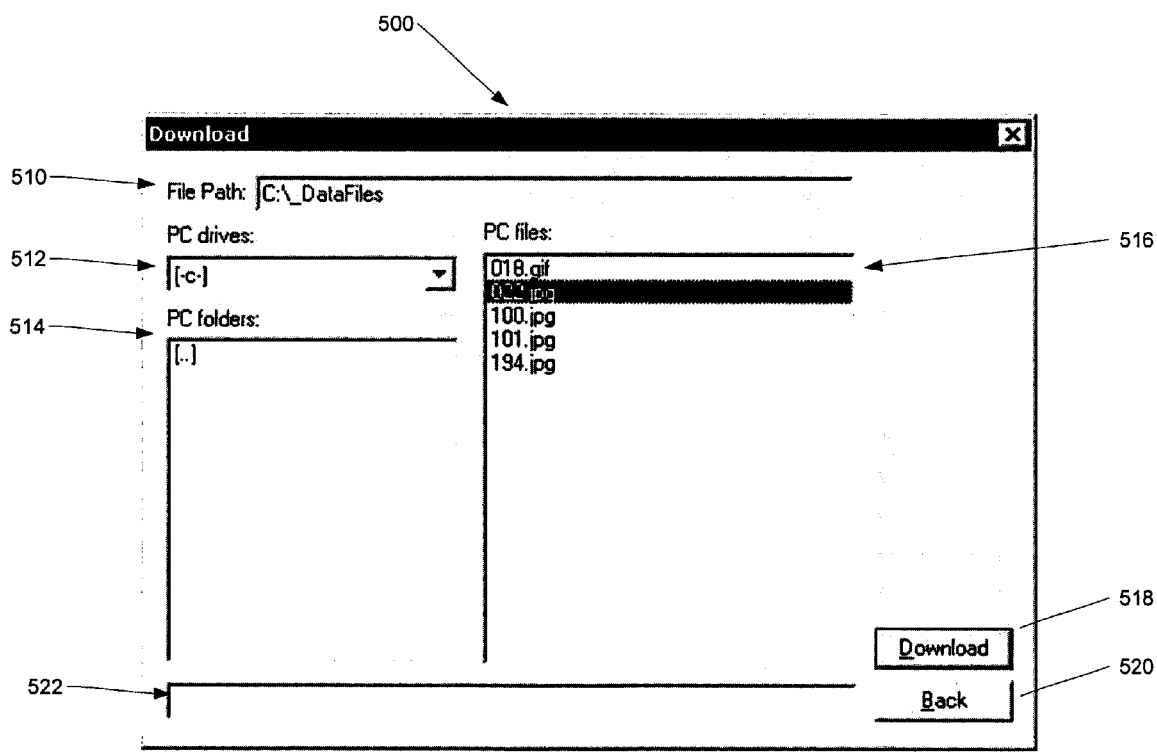
FIG. 5 shows a diagram of an exemplary downloading form that may permit a user to select files resident on a PC such as, for example, the PC of FIG. 1A, from which to download information to a mobile station that may correspond to, for example, the MS of FIG. 1A, in accordance with a representative embodiment of the present invention.

FIG. 5 shows a diagram of an exemplary downloading form 500 that may permit a user to select files resident on a PC such as, for example, the PC 130 of FIG. 1A, from which to download information to a mobile station that may correspond to, for example, the MS 110 of FIG. 1A, in accordance with a representative embodiment of the present invention. The illustration of FIG. 5 comprises a file path text box 510 that may, for example, be used for entry of a file system path to the file to be downloaded. FIG. 5 also comprises a drive select drop-down box 512 that may, for example, be employed to select the drive location of the file of interest. Folders located on the drive selected in drive select drop-down box 512 may be displayed and selected using, for example, a graphical element such as, for example, the folder list box 514, while downloadable files resident in a selected folder may be listed in a files list box 516, for example. A download may be initiated using a user interface element such as the download command button 518, for example, while progress of a download may be shown on a progress indicator such as, for example, the progress bar 522. The user may return from selection and download of files using another command button such as the back command button 520, for example.

In a representative embodiment of the present invention, files may also be uploaded from a mobile station (MS) to a personal computer (PC) based on, for example, a file name. Existing files in the PC with the same names may be overwritten. An application in accordance with a representative embodiment of the present invention may, for example, have a graphical user interface (GUI) window for a user to upload files. Other interfaces may also be employed without departing from the spirit and scope of the present invention. In a representative embodiment of the present invention, a GUI window may include, but is not limited to, the following elements:

1. A list of files on the mobile station. A user may navigate this list and select the files to upload. A user may select a single file or multiple files to upload.
2. A list of folders on the PC. Uploaded files may be placed in the selected folder.
3. A button the user may click to upload the selected files.
4. A window to show the status of the upload process.

Figure 6:
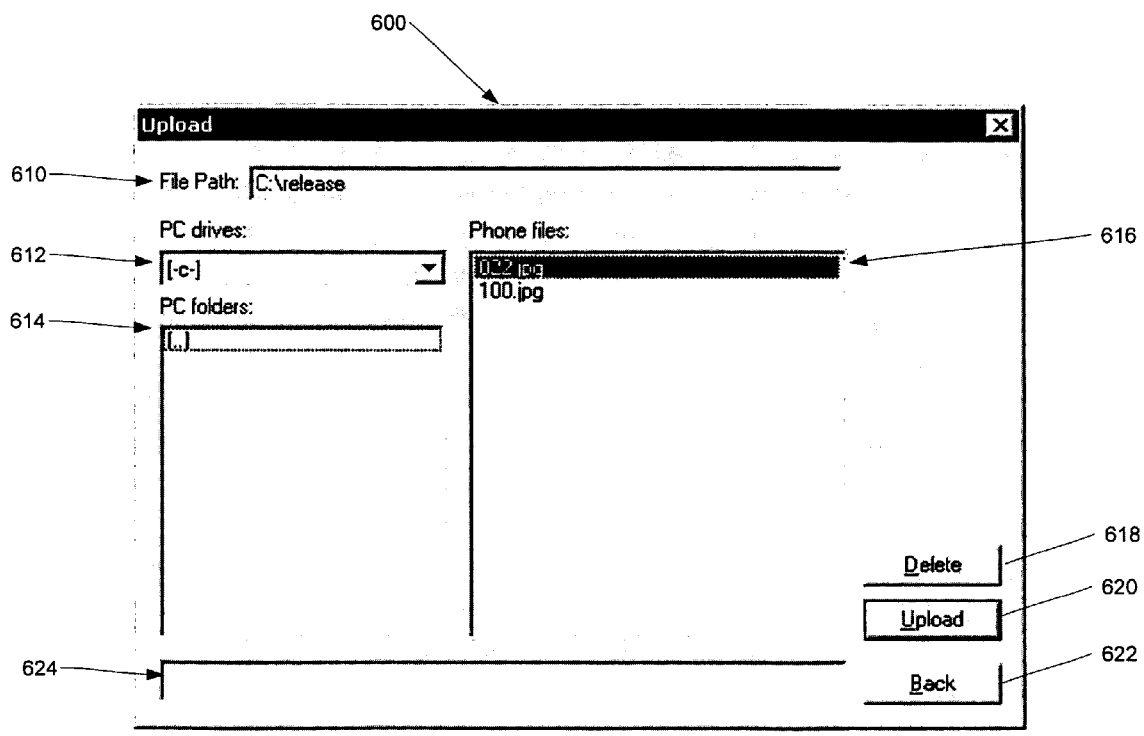
FIG. 6 shows a diagram of an exemplary uploading form that may permit a user to select files resident on a mobile station such as, for example, the MS of FIG. 1A, from which to upload information to a personal computer that may correspond to, for example, the PC of FIG. 1A, in accordance with a representative embodiment of the present invention.

FIG. 6 shows a diagram of an exemplary uploading form 600 that may permit a user to select files resident on a mobile station such as, for example, the MS 110 of FIG. 1A, from which to upload information to a personal computer that may correspond to, for example, the PC 130 of FIG. 1A, in accordance with a representative embodiment of the present invention. The illustration of FIG. 6 comprises a file path text box 610 that may, for example, be used for entry of a file system path to a file to which information is to be uploaded. FIG. 6 also comprises a drive select drop-down box 612 that may, for example, be employed to select the drive location of the file of interest after upload is complete. Folders located on the drive selected in drive select drop-down box 612 may be displayed and selected using, for example, a graphical element such as, for example, the folder list box 614, while up-loadable files resident in the mobile station (e.g., MS 110) may be listed in a files list box 616, for example. An upload may be initiated using a user interface element such as the upload command button 620, for example, while progress of an upload may be shown on a progress indicator such as, for example, the progress bar 624. A selected file may, for example, be deleted from the mobile station using the delete command button 618. The user may return from selection and upload of files using another command button such as the back command button 622, for example.

It is important to note that the exemplary downloading form 500 shown in FIG. 5 and exemplary uploading form 600 shown in FIG. 6 are shown herein for the purpose of illustration only. A representative embodiment of the present invention may employ user interfaces having a greater or lesser number of elements, or a different selection and/or arrangement of elements without departing from the spirit and scope of the present invention. For example, a particular representative embodiment may not have the same GUI elements, layout, color scheme, etc. In a representative embodiment of the present invention, a PC application for communicating with the client application in a mobile station may, for example, be a Win32 application running on a personal computer PC platform. The PC may be connected to a mobile phone (i.e., mobile station) via a cable through a serial port of the PC, or through some other form of communication (e.g., universal serial bus, parallel port, infrared interface, wireless interface).

In a representative embodiment of the present invention, a personal computer application may communicate with mobile station (e.g., mobile phone) client software using a set of AT commands that may be extensions to an AT command set such as that described in the European Telecommunication Standards Institute (ETSI) TS 100 916 v7.5.0 (1999-12) Technical Specification entitled "Digital cellular telecommunications system (Phase 2+) AT Command set for GSM Mobile Equipment (ME) (GSM 07.07 version 7.5.0 Release 1998)", the complete subject matter of which is hereby incorporated herein by reference, in its entirety. A representative embodiment of the present invention may, for example, use a fixed baud rate setting of 115 Kbps during the communication of the commands. In a representative embodiment of the present invention, the following representative commands may be employed to support the exchange of image and melody data between a personal computer and a mobile station (e.g., mobile phone, mobile handset) using a personal computer-based application such as, for example, the PCLINKApplication Task 222, and a mobile station-based application such as, for example, the MMI/PCLinkClient 212, described above with respect to FIG. 2. Although the examples that follow are directed toward personal digital data comprising image and melody data, the present invention is not specifically limited in this respect. Management of a wide variety of personal digital data such as, for example, telephone and address book information, calendar information, ring tones and melodies, call records, digital images and pictures, digital video information, voice records, phone settings, and the like may be supported without departing from the spirit and scope of the present invention.

A representative embodiment of the present invention may, for example, comprise a command to enter and exit a mobile station to/from personal computer (e.g., PC-Link) communication mode. Such a command may have the following syntax:

| Command | Possible response(s) |
| --- | --- |
| AT+CFUN=<mode> | ·OK, or +CME ERROR: <err> |

The above-defined command may be used to enter and exit the mobile station (MS) client to personal computer (PC) application mode. The parameters may, for example, take the following values:

```
<mode> Mode:
    2: enter client mode
    0: exit client mode and return to normal operating mode.
```

In a representative embodiment of the present invention, the client mode may, for example, be an exclusive mode where normal mobile station (e.g., GSM/GPRS) services are not supported.

In a representative embodiment of the present invention, authentication and password protection may be supported.

A representative embodiment of the present invention may, for example, comprise a command for inquiry about images stored on the mobile station (MS). Such a command may support the following command forms, for example:

| Command | Possible response(s) |
| --- | --- |
| AT+IPIC=<ImageType> | OK, or +CME ERROR: <err> |
| AT+IPIC? | OK, or +CME ERROR: <err> |
| Note: Test command | |
| AT+IPIC=? | .+IPIC=(0-3)OK+CME ERROR: <err> |

The above-defined command may, for example, return metadata such as file-names and sizes of images. The parameters may, for example, take the following values:

```
<ImageType> Image types:
    0: wbmp
    1: gif
    2: jpeg
    3: png
[<filename and size>] file-names and sizes in ASCII; e.g.:
Picture1 180
Picture2...560
```

In a representative embodiment of the present invention, such a command may be used to inquire about information for images currently stored on the mobile station (MS).

A representative embodiment of the present invention may, for example, comprise a command for downloading images for storage on the mobile station (MS). Such a command may support the following command forms, for example:

| Command | Possible response(s) |
| --- | --- |
| AT+DPIC=<ImageType>, <filename>,<size> | • +DPIC: <0 or err> |
| [Packet binary data transferring] | • [Packet binary data- opcode: OK] |
| AT+DPIC? | • OK or +CME ERROR: <err> |
| Note: Test command | |
| AT+DPIC=? | • +DPIC="ImageType","filename", "filesize" |
| | • OK· +CME ERROR: <err> |

In a representative embodiment of the present invention, such a command may be used to download images from a personal computer application to a mobile station (e.g., mobile phone) client. After receiving a "+DPIC; 0" response from mobile station (MS), the personal computer application (e.g., PCLink Application Task 222) may start sending packets of binary data to the MS. When the received message is complete, the MS may respond with a "OK" response, and the personal computer application may send another message containing binary image data. In a representative embodiment of the present invention, a binary message of image data may, for example, have a maximum size of 512 bytes.

In a representative embodiment of the present invention, the parameters to the above command may, for example, take the following values:

<ImageType> Image types:
    0: wbmp
    1: gif
    2: jpeg
    3: png
<filename> file-name in ASCII.
<size> file-size in ASCII.

[Packet binary data transferring]: The binary data stream may have the following format:

| Opcode byte | Length high byte | Length low byte | Data bytes |
| --- | --- | --- | --- |

Opcode byte:
  0xa0: OK
  0xa1: One whole message data (entire file fits in 1 packet data)
  0xb0: first data
  0xb1: concatenated data
  0xb2: last data
  0xc0: Failure (resend)
  (TBD): (may used by application layer)
Length: may be set to equal the number of data bytes+3 bytes.
Data bytes: stream of binary application data.

In a representative embodiment of the present invention, the opcode byte may be used by an application to simplify the data processing and consequently to reduce overall overhead. The length parameter may, for example, equal a value of 3 when the message comprises only an opcode without any data. An opcode having a hexadecimal value represented as 0xa1 may be used, for example, when the entire file fits within one packet of data. Otherwise, an opcode having a hexadecimal value represented as 0xb0 may be used, for example, to mark the first packet exchanged. An opcode having a hexadecimal value represented as 0xb1 may, for example, be used for succeeding packets, and an opcode having a hexadecimal value represented as 0xb2 may, for example, be used for the last or final packet in a file transfer. To assure the integrity of the data file being transferred, an extra 2-bytes of cyclic redundancy check (CRC) checksum may be added at the end of the file. The CRC checksum may be used by a receiver to assure that the file received is not corrupted. A value having a hexadecimal value represented as 0x0000 may, for example, be used as the default CRC checksum value when a CRC is not used. In a representative embodiment of the present invention, an inactivity timeout that occurs during binary transfers may put the mobile station (MS) back into a client mode, for example.

A representative embodiment of the present invention may, for example, comprise a command for uploading images from a mobile station (MS) for storage on a personal computer. Such a command may support the following command forms, for example:

| Command | Possible response(s) |
| --- | --- |
| AT+UPIC=<ImageType>, <filename> [Packet binary data- opcode: OK] | • +UPIC: <0 or err> |
| AT+UPIC? Note: Test command | • OK or +CME ERROR: <err> |
| AT+UPIC=? | • +UPIC="ImageType","filename" OK<br>• +CME ERROR: <err> |

In a representative embodiment of the present invention, such a command may be used to upload images from a mobile station client to a personal computer application such as, for example, the PCLink Application Task 222 of FIG. 2. After receiving a "+UPIC; 0" response from a mobile station, the personal computer application may start receiving packet of binary data from a mobile station. When sending of messages to the personal computer application is complete, the mobile station (MS) may respond with a binary "OK" message. The personal application may then send another binary message containing image data. In a representative embodiment of the present invention, the binary image data in the message may, for example, be a maximum of 512 bytes in size.

In a representative embodiment of the present invention the parameters to the above command may, for example, take the following values:

<ImageType> Image types:
    0: wbmp
    1: gif
    2: jpeg
    3: png
<filename> file-name in ASCII.

[Packet binary data transferring]: The binary data stream may have the following format:

| Opcode byte | Length high byte | Length low byte | Data bytes |
| --- | --- | --- | --- |

Opcode byte (hexadecimal):
  0xa0: OK
  0xa1: One whole message data (entire file fits in 1 packet data)
  0xb0: first data
  0xb1: concatenated data
  0xb2: last data
  0xc0: Failure (resend)
  (Other values may be used by an application layer)
Length: equals the number of Data bytes+3 bytes.
Data bytes: stream of binary application data.

In a representative embodiment of the present invention, the opcode byte may be used by an application to simplify the data processing and consequently to reduce overall overhead. The length parameter may, for example, equal a value of 3 when the message comprises only an opcode without any data. An opcode having a hexadecimal value represented as 0xa1 may, for example, be used when the entire file fits within one packet of data. Otherwise, an opcode having a hexadecimal value represented as 0xb0 may, for example, be used to mark the first packet exchanged. An opcode having a hexadecimal value represented as 0xb1 may, for example, be used for succeeding packets, and an opcode having a hexadecimal value represented as 0xb2 may, for example, be used for the last packet. To assure the integrity of the data file being transferred, an extra 2-bytes of cyclic redundancy check (CRC) checksum may be added at the end of the file. The CRC checksum may be used by a receiver to assure that the file received is not corrupted. A value having a hexadecimal value represented as 0x0000 may, for example, be employed as the default CRC checksum value when a CRC is not used. In a representative embodiment of the present invention, an inactivity timeout that occurs during binary transfers may put the mobile station (MS) back into a client mode, for example.

A representative embodiment of the present invention may, for example, comprise a command for the deletion of images from a mobile station (MS). Such a command may, for example, support the following command forms:

| Command | Possible response(s) |
|---|---|
| AT+DELP=<ImageType>, <filename> | • OK, or +CME ERROR: <err> |
| AT+DELP? Note: Test command | • OK or +CME ERROR: <err> |
| AT+DELP=? | • +DELP="ImageType","filename" OK<br>• +CME ERROR: <err> |

In a representative embodiment of the present invention the parameters to the above command may, for example, take the following values:

<ImageType> Image types:
    0: wbmp
    1: gif
    2: jpeg
    3: png
<filename> file-name in ASCII.

A representative embodiment of the present invention may, for example, comprise a command for the inquiry about metadata information for the melodies (e.g., music, tunes, ring tones) stored on a mobile station (MS). Such a command may support the following command forms, for example:

| Command | Possible response(s) |
|---|---|
| AT+IMEL=<MelodyType> | • OK, or +CME ERROR: <err> [<filename and file size>] |
| AT+IMEL? Note: Test command | • OK, or +CME ERROR: <err> |
| AT+IMEL=? | • +IMEL=(0-4) OK<br>• +CME ERROR: <err> |

In a representative embodiment of the present invention the parameters to the above command may, for example, take the following values:

<MelodyType> Melody types:
    0: i-Melody
    1: e-Melody
    2: Mid
    3: Wav
    4: Amr
[<file-name and Size>] fil-names and sizes in ASCII; e.g.:
    Audio1 180
    Audio2...560

A representative embodiment of the present invention may, for example, comprise a command for the downloading of melodies (e.g., music, tunes, ring tones) from a personal computer to be stored on a mobile station (MS). Such a command may support the following command forms:

| Command | Possible response(s) |
|---|---|
| AT+DMEL=<MelodyType>, <filename>,<size> [Packet binary data transferring] | • +DMEL: <0 or err><br>• [Packet binary data- opcode: OK] |
| AT+DMEL? Note: Test command | • OK or +CME ERROR: <err> |
| AT+DMEL=? | • +DMEL="MelodyType","filename", "filesize" OK<br>• +CME ERROR: <err> |

In a representative embodiment of the present invention, such a command may be used to download melodies from the personal computer application to the mobile station client. After receiving a "+DMEL; 0" response from a mobile station, the personal computer application may start sending packets of binary data to the mobile station. When the received message is complete, the mobile station may respond with a "OK" message, and the personal computer application may send another binary message containing melody data. In a representative embodiment of the present invention, the maximum size of binary melody data in a message may, for example, be 512 bytes. In a representative embodiment of the present invention the parameters to the above command may, for example, take the following values:

<MelodyType> Melody types:
    0: i-Melody
    1: e-Melody
    2: Mid
    3: Wav
    4: Amr
<filename> file-name in ASCII.
<size> file-size in ASCII.

[Packet binary data transferring]: The binary data stream may have the following format:

| Opcode byte | Length high byte | Length low byte | Data bytes |
|---|---|---|---|

Opcode byte (hexadecimal):
    0xa0: OK
    0xa1: One whole message data (entire file fits in 1 packet data)
    0xb0: first data
    0xb1: concatenated data
    0xb2: last data 0xc0: Failure (resend)

(Other values may be used by application layer)

Length: equals the number of Data bytes+3 bytes.

Data bytes: stream of binary application data.

In a representative embodiment of the present invention, the opcode byte may be used by an application to simplify the data processing and consequently to reduce overall overhead. The length parameter may, for example, equal a value of 3 when the message comprises only an opcode without any data. An opcode having a hexadecimal value represented as 0xa1 may be used when the entire file fits within one packet of data. Otherwise, an opcode having a hexadecimal value represented as 0xb0 may be used to mark the first packet exchanged. An opcode having a hexadecimal value represented as 0xb1 may be used for succeeding packets, and an opcode having a hexadecimal value represented as 0xb2 may be used for the last packet. To assure the integrity of the data file being transferred, an extra 2-bytes of cyclic redundancy check (CRC) checksum may be added at the end of the file. The CRC checksum may be used by a receiver to assure that the file received is not corrupted. A value having a hexadecimal value represented as 0x0000 may, for example, be used as the default CRC checksum value when a CRC is not used. In a representative embodiment of the present invention, an inactivity timeout that occurs during binary transfers may put the mobile station (MS) back into a client mode, for example.

A representative embodiment of the present invention may, for example, comprise a command for the uploading of melodies (e.g., music, tunes, ring tones) from a mobile station (MS) to be stored on a personal computer (PC). Such a command may support the following command forms, for example:

| Command | Possible response(s) |
| --- | --- |
| AT+UMEL=<MelodyType>, <filename> In response to <+UMEL:0, [Packet binary data- opcode: OK] | • +UMEL: <0 or err><br>Following [Packet binary data- opcode: OK], [Packet binary data transferring] |
| AT+UMEL? Note: Test command | • OK or +CME ERROR: <err> |
| AT+UMEL=? | • +UMEL="MelodyType","filename" OK<br>• +CME ERROR: <err> |

In a representative embodiment of the present invention, such a command may be used to upload melodies (e.g., music, ring tones) from a mobile station client to personal computer application. After receiving a "+UMEL: 0" response from a mobile station (MS), a personal computer application may start receiving packets of binary melody data from a mobile station. When a complete message has been sent to the personal computer application, the mobile station may respond with a binary "OK" message. The personal computer application may then send another binary message. The size of the binary melody data in a message may, for example, be limited to a maximum of 512 bytes.

In a representative embodiment of the present invention the parameters to the above command may, for example, take the following values:

<MelodyType> Melody types:
    0: i-Melody
    1: e-Melody
    2: Mid

-continued

3: Wav
    4: Amr
    <filename> file-name in ASCII.

[Packet binary data transferring]: The binary data stream may have the following format:

| Opcode byte | Length high byte | Length low byte | Data bytes |
| --- | --- | --- | --- |

Opcode byte (hexadecimal):

0xa0: OK

0xa1: One whole message data (entire file fits in 1 packet data)

0xb0: first data

0xb1: concatenated data

0xb2: last data

0xc0: Failure (resend)

(Other values may be used by application layer)

Length: equals the number of Data bytes+3 bytes.

Data bytes: stream of binary application data.

In a representative embodiment of the present invention, the opcode byte may be used by an application to simplify the data processing and consequently to reduce overall overhead. The length parameter may, for example, equal a value of 3 when the message comprises only an opcode without any data. An opcode having a hexadecimal value represented as 0xa1 may, for example, be used when the entire file fits within one packet of data. Otherwise, an opcode having a hexadecimal value represented as 0xb0 may, for example, be used to mark the first packet exchanged. an opcode having a hexadecimal value represented as 0xb1 may, for example, be used for succeeding packets, and an opcode having a hexadecimal value represented as 0xb2 may, for example, be used for the last packet. To assure the integrity of the data file being transferred, an extra 2-bytes of cyclic redundancy check (CRC) checksum may be added at the end of the file. The CRC checksum may be used by a receiver to assure that the file received is not corrupted. A value having a hexadecimal value represented as 0x0000 may be used as the default CRC checksum value when a CRC is not used. In a representative embodiment of the present invention, an inactivity timeout that occurs during binary transfers may put the mobile station (MS) back into a client mode, for example.

A representative embodiment of the present invention may, for example, comprise a command for the deletion of melodies (e.g., music, tunes, ring tones) from a mobile station (MS). Such a command may support the following command forms, for example:

| Command | Possible response(s) |
| --- | --- |
| AT+DELM=<MelodyType>, <filename> | • OK, or +CME ERROR: <err> |
| AT+DELM? Note: Test command | • OK or +CME ERROR: <err> |
| AT+DELM=? | • +DELM="MelodyType","filename" OK<br>• +CME ERROR: <err> |

In a representative embodiment of the present invention the parameters to the above command may, for example, take the following values:

<Melody Type> Melody types:
- 0: i-Melody
- 1: e-Melody
- 2: Mid
- 3: Wav
- 4: Amr A representative embodiment of the present invention may, for example, comprise a command for authentication of an external application (e.g., on a personal computer (PC) such as the PC 130 of FIG. 1A) to a mobile station (MS) such as, for example, the MS 110 of FIG. 1A. Such a command may support the following command forms, for example:

| Command | Possible response(s) |
|---|---|
| AT+PLCK=<LockType>,"password" | • OK, or +CME ERROR: <err> |
| AT+PLCK? | • OK or +CME ERROR: <err> |
| Note: Test command | |
| AT+PLCK=? | • +PLCK:<LockType> OK<br>• +CME ERROR: <err> |

In a representative embodiment of the present invention the parameters to the above command may, for example, take the following values:

<LockType>:
- 0: phone lock
- 1: SIM lock (PIN1)
- 2: SIM lock (PIN2)
- 3: SIM lock (PUK)

"password": may be a lock code as an ASCII sequence of characters. In a representative embodiment of the present invention, the display of a mobile station (e.g., the display of the MS 110 of FIG. 1A) may, upon entry of the lock code, hide the lock code (e.g., by displaying "*******").

Figure 7:
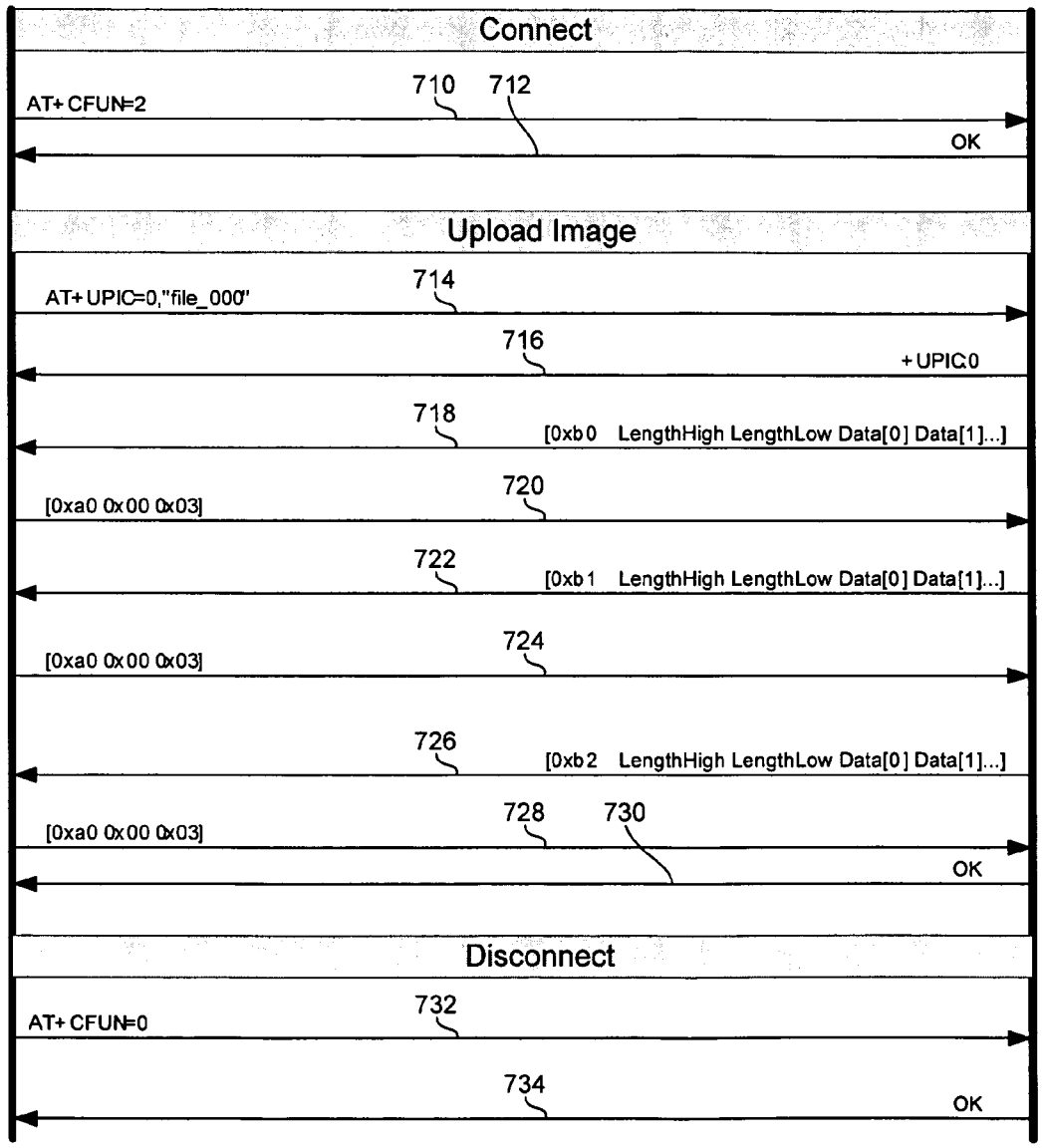
FIG. 7 shows a message exchange diagram of an exemplary upload of an image from a mobile station to a personal computer that may correspond to, for example, the mobile station and the PC, respectively, of FIG. 1A, in accordance with a representative embodiment of the present invention.

FIG. 7 shows a message exchange diagram of an exemplary upload of an image from a mobile station to a personal computer that may correspond to, for example, the mobile station 110 and the PC 130, respectively, of FIG. 1A, in accordance with a representative embodiment of the present invention. The image to be uploaded may be selected using a user interface such as, for example, the uploading form 600 illustrated and described above with respect to FIG. 6. The diagram of FIG. 7 shows a vertical bar on the left representing a PC-Link Application 702 that may correspond to, for example, the PCLINKApplication Task 222 running on the PC 230 of FIG. 2. The vertical bar on the right of FIG. 7 represents a mobile station PC-Link Client 704 that may correspond to, for example, the MMI/PCLinkClient 212 running on the MS 220 of FIG. 2. Following establishment of a physical communication path between the mobile station (e.g., MS 220) and the PC (e.g., PC 230), the PC-Link Application 702 may send a message 710 containing an AT command such as, for example, "AT+CFUN=2", to the PC-Link Client 704, to establish a communication session between PC and the mobile station. If authentication is not required, successful establishment may be indicated by the PC-Link Client 704 by returning a message 712 containing an "OK" response. If authentication is required, the message exchange illustrated in FIG. 4 may be employed to establish the communication session.

In a representative embodiment of the present invention, the PC-Link Application 702 may begin the upload of the selected image by sending a message 714 containing an AT command such as, for example, "AT+UPIC,'file_000'" to the PC-Link Client 704, where 'file_000' may represent the name of the selected image file on the mobile station. In response, the mobile station (e.g., MS 110 of FIG. 1) may send a message 716 containing confirmation of the received AT command "+UPIC:0", and may then begin sending the requested image file. A first message 718 may, for example, begin with an opcode represented by hexadecimal 0xb0, and may contain length information (e.g., LengthHigh and LengthLow) and the first block of image data (e.g., Data[0] . . . ). The opcode used (e.g., 0xb0) may indicate that the block is the initial block in the transfer of data.

Correct receipt by the PC-Link Application 702 may result in the sending to the PC-Link Client 704 of a response message 720 containing a hexadecimal representation of an "OK" indication (e.g., 0xa0 0x00 0x03). Additional blocks of data from the selected image file may then be sent using messages such as, for example, message 722. As shown in the example of FIG. 7, these messages may contain an opcode value represented in message 722 as hexadecimal 0xb1, to indicate that the block of data is an intermediate block in the image file. Each successfully received message may be acknowledged by the PC-Link Application 702 by a response message (e.g., message 724) containing a hexadecimal representation of an "OK" indication.

The final block of data in the image upload may be sent from the PC-Link Client 704 to the PC-Link Application 702 in a message 726, using an opcode that may be represented by a hexadecimal 0xb2. This opcode value (i.e., 0xb2) may be used to indicate that the message contains the last block of data in the image upload. This final uploaded block may be acknowledged by the PC-Link Application 702 using a response message (e.g., message 728) containing a hexadecimal representation of an "OK" indication. In response, the PC-Link Client 704 may acknowledge the acknowledgement of the PC-Link Application 702, by sending a message 730 containing a representation of an "OK" indication.

Following completion of the uploading of the selected image file, the PC-Link Application 702 may send a message 732, requesting that the communication session be ended/disconnected, using an AT command that may be represented as "AT+CFUN=0". In response to this request, the PC-Link Client 704 may send a message 734 containing a response indication of "OK", ending communication.

Figure 8:
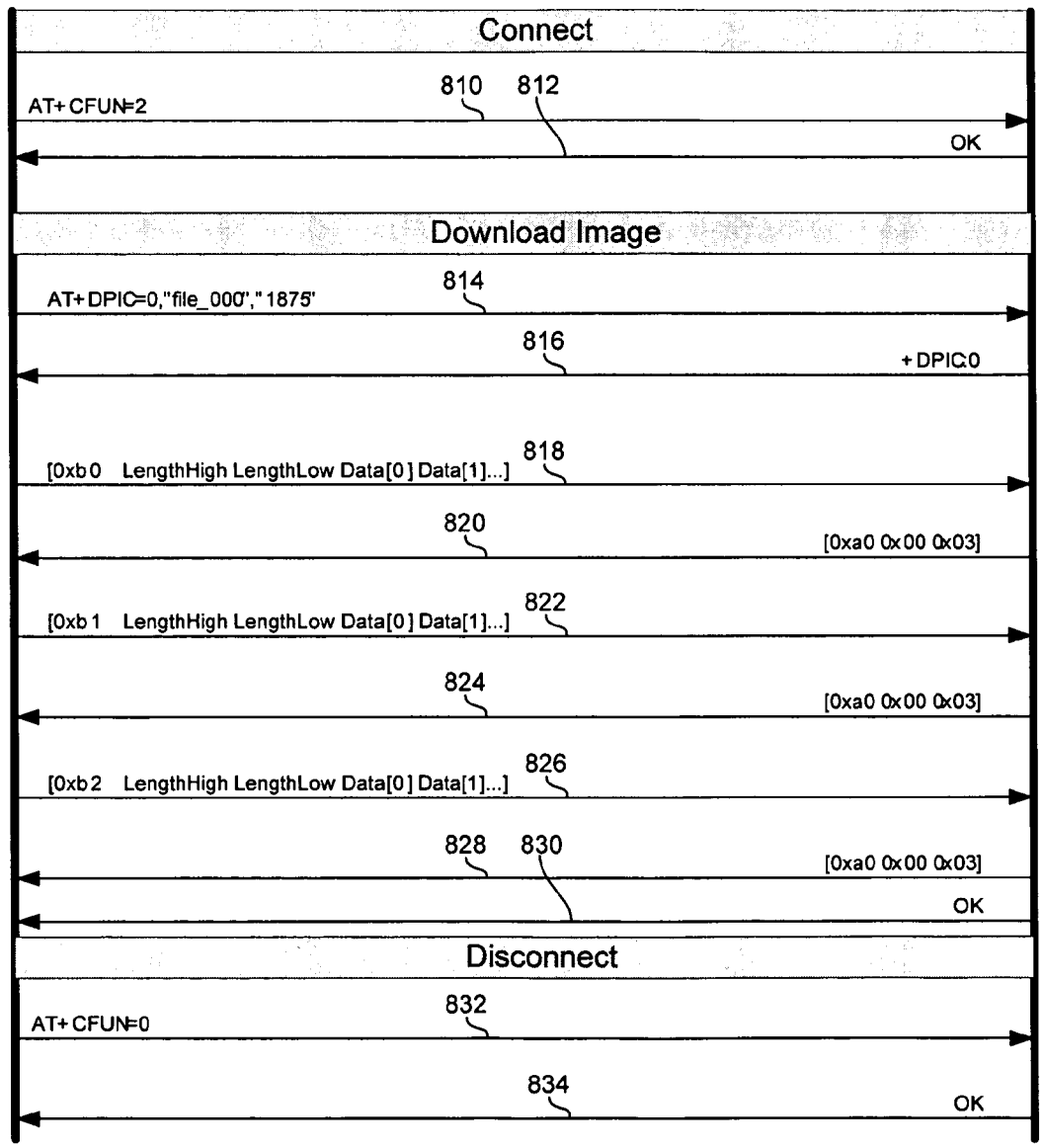
FIG. 8 shows a message exchange diagram of an exemplary download of an image from a personal computer to a mobile station that may correspond to, for example, the PC and the MS, respectively, of FIG. 1A, in accordance with a representative embodiment of the present invention.

FIG. 8 shows a message exchange diagram of an exemplary download of an image from a personal computer to a mobile station that may correspond to, for example, the PC 130 and the MS 110, respectively, of FIG. 1A, in accordance with a representative embodiment of the present invention. The image to be downloaded may be selected using a user interface such as, for example, the downloading form 500 illustrated and described above with respect to FIG. 5. The diagram of FIG. 8 shows a vertical bar on the left representing a PC-Link Application 802 that may correspond to, for example, the PCLINKApplication Task 222 running on the PC 230 of FIG. 2. The vertical bar on the right of FIG. 8 represents a mobile station PC-Link Client 804 that may correspond to, for example, the MMI/PCLinkClient 212 running on the MS 220 of FIG. 2. Following establishment of a physical communication path between the mobile station (e.g., MS 220) and the PC (e.g., PC 230), the PC-Link Application 802 may send a message 810 containing an AT command such as, for example, "AT+CFUN=2", to the PC-Link Client 804, to establish a communication session between PC and the mobile station. If authentication is not required, successful establishment may be indicated by the PC-Link Client 804 by returning a message 812 containing an "OK" response. If authentication is required, the message exchange illustrated in FIG. 4 may be employed to establish the communication session.

In a representative embodiment of the present invention, the PC-Link Application 802 may begin the download of the selected image by sending a message 814 containing an AT command such as, for example, "AT+DPIC,'file_000',1875" to the PC-Link Client 804, where 'file_000' may represent the name of the selected image file on the mobile station, and the value 1875 may represent the size of the image file in bytes. In response, the mobile station (e.g., MS 110 of FIG. 1) may send a message 816 containing confirmation of the received AT command "+DPIC:0", and may then prepare to receive the requested image file. The PC-Link Application 802 may then send a first message 818 that may, for example, begin with an opcode represented by hexadecimal 0xb0, and may contain length information (e.g., LengthHigh and LengthLow) and the first block of image data (e.g., Data[0] . . . ). The opcode used (e.g., 0xb0) may indicate that the block is the initial block in the transfer of data.

Correct receipt of the message 818 by the PC-Link Client 804 may result in a response message 820 containing a hexadecimal representation of an "OK" indication (e.g., 0xa0 0x00 0x03). Additional blocks of data from the selected image file may then be sent by the PC-Link Application 802 using messages such as, for example, message 822. As shown in the example of FIG. 8, these messages may contain an opcode value represented in message 822 as hexadecimal 0xb1, to indicate that the block of data is an intermediate block in the image file. Each successfully received message may be acknowledged by the PC-Link Client 804 by a response message (e.g., message 824) containing a hexadecimal representation of an "OK" indication.

The final block of data in the image download may be sent from the PC-Link Application 802 to the PC-Link Client 804 in a message 826, using an opcode that may be represented by a hexadecimal 0xb2. This opcode value (i.e., 0xb2) may be used to indicate that the message contains the last block of data in the image download. This final downloaded block may be acknowledged by the PC-Link Client 804 using a response message (e.g., message 828) containing a hexadecimal representation of an "OK" indication (e.g., 0xa0 0x00 0x03). The PC-Link Client 804 may follow up with an additional message 830 containing another representation of an "OK" indication, to signify the end of the download.

Following completion of the uploading of the selected image file, the PC-Link Application 802 may send a message 832, requesting that the communication session be ended/disconnected, using an AT command that may be represented as "AT+CFUN=0". In response to this request, the PC-Link Client 804 may send a message 834 containing a response indication of "OK", ending communication.

Figure 9:
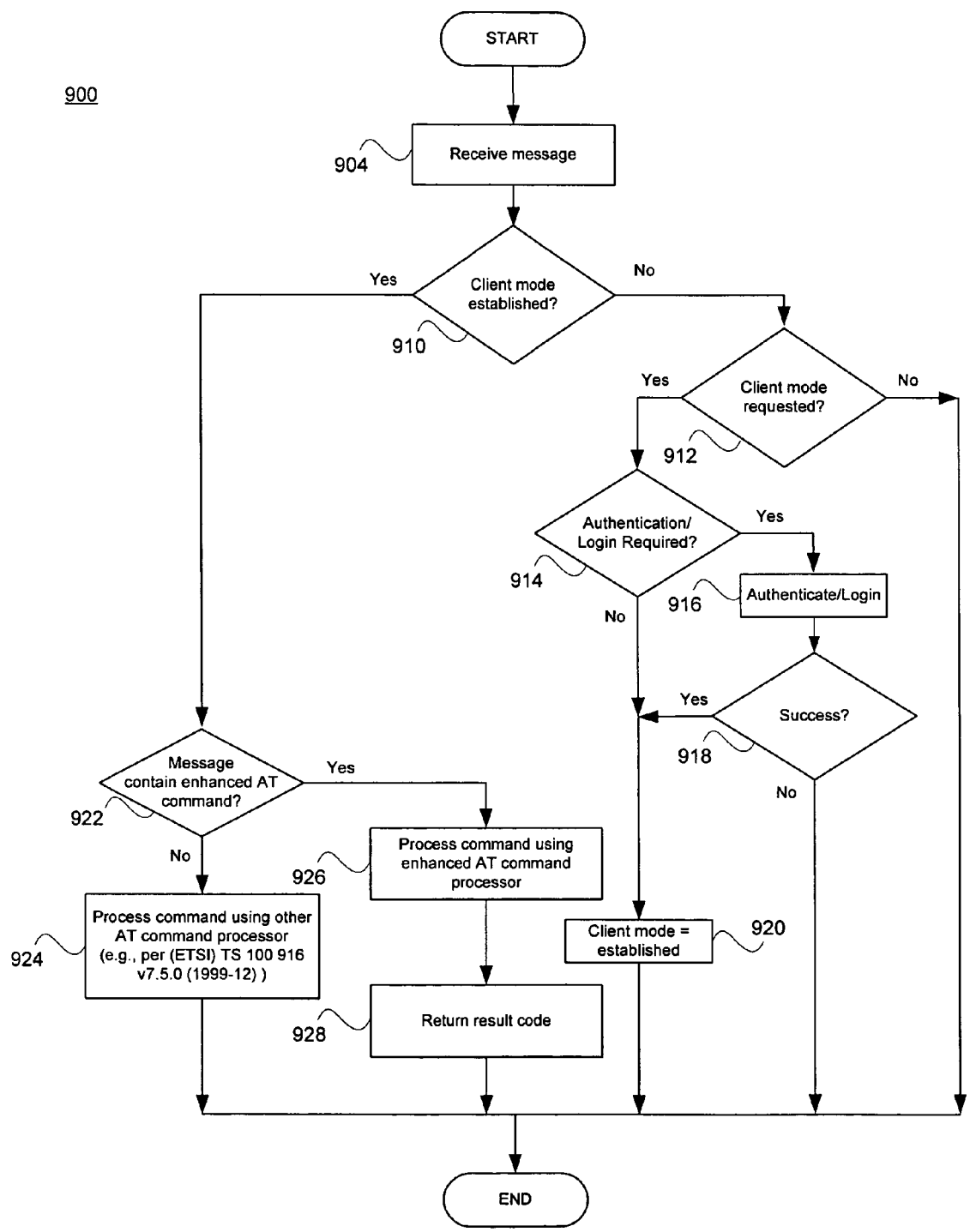
FIG. 9 shows a flowchart illustration of a method of operating a handheld electronic device such as, for example, a mobile cellular handset (i.e., a mobile phone or cellular phone) to support the transfer of personal digital data with a second electronic device such as, for example, a personal computer, in accordance with a representative embodiment of the present invention.

FIG. 9 shows a flowchart 900 illustration of a method of operating a handheld electronic device such as, for example, a mobile cellular handset (i.e., a mobile phone or cellular phone) to support the transfer of personal digital data with a second electronic device such as, for example, a personal computer, in accordance with a representative embodiment of the present invention. As an aid in explaining the flowchart 900, the following discussion may make reference to elements of FIG. 1 through 8. The method of FIG. 9 begins after a communication path is established between a portable electronic device such as, for example, the MS 110 of FIG. 1A and a second device such as, for example, the PC 130 of FIG. 1A. Establishment of a communication path may comprise the connection of a cable between the MS 110 and the PC 130 or arranging the MS 110 and the PC 130 within proximity of one another to enable a wireless path such as an infrared link, or a Bluetooth or IEEE 802.11a/b/g/n link to function. Although the flowchart 900 shows a start and an end, the illustrated method may be repeated each time a message is received over the communication path.

Following establishment of the communication link, application software on the PC 130 may send a message that may be received by the handheld electronic device (e.g., the MS 110) (block 904). The MS 110 may then determine whether a client mode has been established (block 910). If a client mode is not already established, a determination may be made as to whether the message requests establishment of client mode (block 912). If the received message does not request client mode, the method of FIG. 9 then ends, to be initiated when another message is received.

If, however, the received message does request the establishment of client mode such as, for example, using an AT command such as "CFUN" described above, the MS 110 may determine whether authentication/login is required (block 914). If authentication/login is not required, client mode may be considered to be established (block 920). The method of FIG. 9 may then end, to be initiated when another message is received. If authentication/login is required (block 914), an authentication/login process with the PC 130 may be performed (block 916) that may correspond to, for example, the authentication method shown in FIG. 3. If authentication/login is successful (block 918), client mode may be considered to be established (block 920). If, however, authentication/login is not successful, the method of FIG. 9 then ends, to be initiated when another message is received.

If a message is received (block 904), and client mode is already established (block 910), a determination may be made as to whether the message contains an enhanced AT command (block 922). If the message contents does not represent an Enhanced AT command in accordance with a representative embodiment of the present invention, the message contents may be processed using an AT command processor supporting commands defined by the European Telecommunication Standards Institute (ETSI) TS 100 916 v7.5.0 (1999-12) Technical Specification entitled "Digital cellular telecommunications system (Phase 2+) AT Command set for GSM Mobile Equipment (ME) (GSM 07.07 version 7.5.0 Release 1998)", the complete subject matter of which is hereby incorporated herein by reference, in its entirety (block 924).

If the received message does contain an enhanced AT command in accordance with a representative embodiment of the present invention (block 922), the enhanced AT command may be processed, as described above, and below with respect to FIG. 10 (block 926). The method of FIG. 9 may then send a result code to the PC 130 (block 928), to indicate the outcome of the command processing. The method of FIG. 9 then ends, to be initiated when another message is received.

Figure 10:
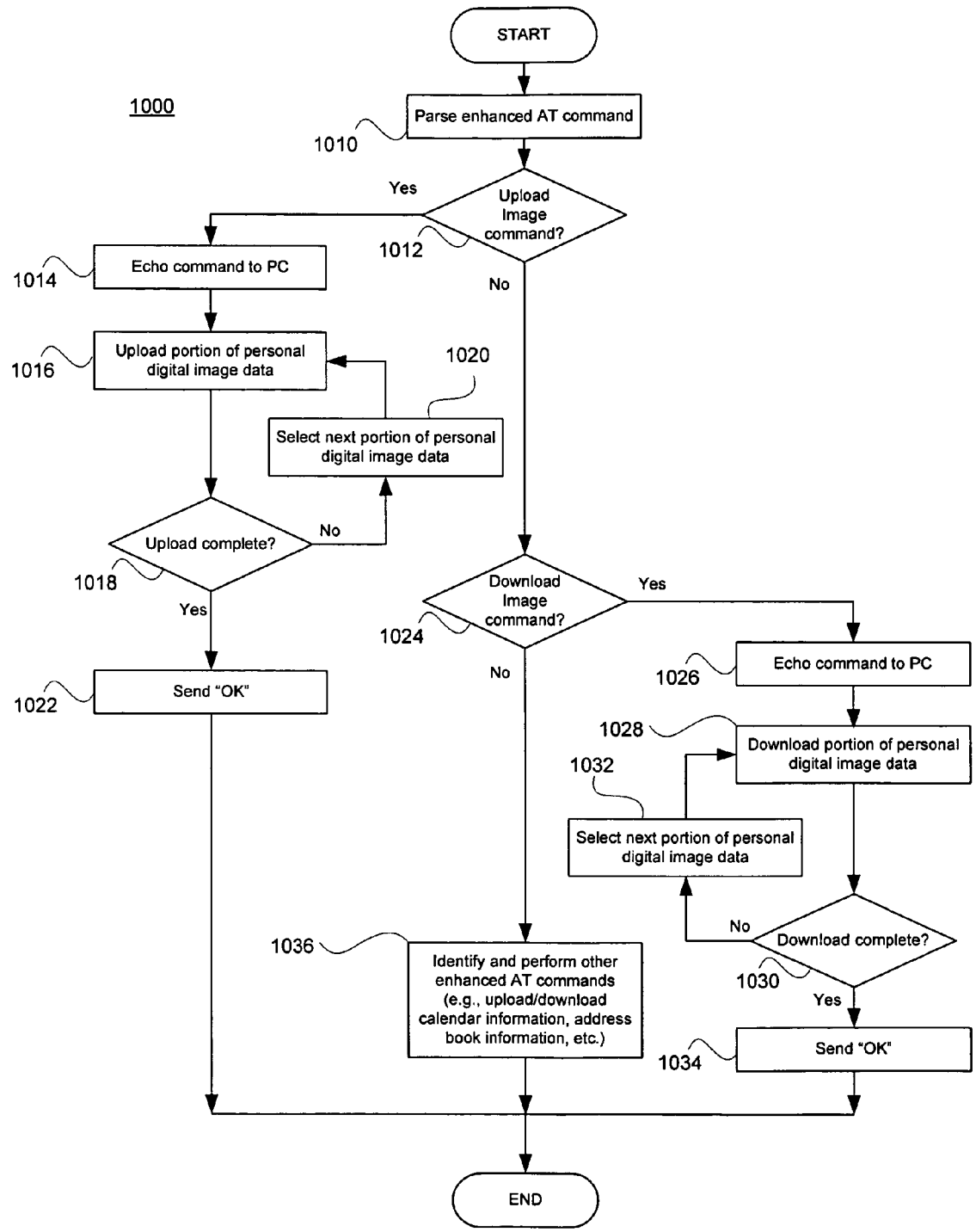
FIG. 10 shows a flowchart illustrating additional details of the processing of enhanced AT commands in a method that may correspond to, for example, that illustrated by the flowchart of FIG. 9, in accordance with a representative embodiment of the present invention.

FIG. 10 shows a flowchart 1000 illustrating additional details of the processing of enhanced AT commands in a method that may correspond to, for example, that illustrated by the flowchart 900 of FIG. 9, in accordance with a representative embodiment of the present invention. As an aid in explaining the flowchart 1000, the following discussion may make reference to elements of FIG. 1A through 8. The activities represented in the flowchart 1000 of FIG. 10 may correspond to, for example, the activities of processing of an enhanced AT command represented in FIG. 9 (block 926).

The method of FIG. 10 begins after a message has been received from a device such as, for example, the PC 130 of FIG. 1A by a handheld electronic device such as, for example, MS 110 of FIG. 1A, and has been identified as an enhanced AT command in accordance with a representative embodiment of the present invention. The handheld electronic device (e.g., the MS 110) may first parse the enhanced AT command to determine the type of command, and any associated parameters (block 1010). The handheld electronic device may then determine whether the command is an upload image command (block 1012). If the command is found to be an upload image command, the MS 110 may, for example, echo the command to the PC 130 (block 1014), and may begin uploading personal image data to the PC 130 in a series of portions or blocks (block 1016). A determination may then be made as to whether the upload of personal image data is complete (block 1018). If the upload is not complete, the handheld electronic device (e.g., the MS 110) may select another portion (i.e., block) of personal image data for upload (block 1020), and may upload the selected portion to the PC 130 (block 1016). The uploading of personal image data may continue until all of the personal image data is transferred to the PC 130. When the upload is found to be complete (block 1018), the MS 110 may send an indication to the PC 130 representing "OK", to indicate the completion (block 1022). The method of FIG. 10 may then end.

If it is determined that the enhanced AT command is not an upload image command (block 1012), the handheld electronic device may determine whether the command is a download command (block 1024). If the command is found to be a download image command, the MS 110 may, for example, echo the command to the PC 130 (block 1026), and may begin downloading personal image data from the PC 130 in a series of portions or blocks (block 1028). After each portion is transferred from the PC 130, a determination may then be made as to whether the download of personal image data is complete (block 1030). If the download is not complete, the handheld electronic device (e.g., the MS 110) may select another portion (i.e., block) of personal image data for download (block 1032), and may download the selected portion to the PC 130 (block 1028). The downloading of personal image data may continue until all of the personal image data is transferred from the PC 130. When the download is found to be complete (block 1030), the MS 110 may send an indication representing "OK" to the PC 130, to indicate the completion (block 1034), and the method of FIG. 10 may then end.

If it is determined that the enhanced AT command is not a download image command (block 1024), similar checking of the received enhanced AT command may be performed, to identify and perform other enhanced AT commands in accordance with a representative embodiment of the present invention (block 1036). For example, a representative embodiment of the present invention may be adapted to process any of the enhanced AT commands described above including, but not limited to those supporting the transfer of address book information, calendar information, ring tones, call record information, and other personal digital data that may reside in a handheld electronic device such as, for example, cellular phones, personal digital assistants, pagers, and similar personal electronic device that permit the entry, management, and storage of personal collections of images, sounds, email, to-do lists, calendars, and the like.

In a representative embodiment of the present invention, a PC may be a tool of mobile phone (i.e., mobile station, cellular phone) management that may be extended to use for general packet radio service (GPRS) and other phone products.

In a representative embodiment of the present invention, a PC application may upload/download image (e.g., picture) and melody (e.g., music, ring tone) information between a phone (i.e., mobile station, mobile phone) and personal computer (PC). A representative embodiment of the present invention may be extended to support uploading/downloading of phonebook information, calendar information, to-do list information, short message service (SMS) message information, phone (i.e., mobile station, mobile phone) settings information, and wireless application protocol (WAP) setting information.

A representative embodiment of the present invention may define a set of AT commands and a data flow architecture for uploading and downloading, for example, images and melodies. The AT command set and data flow architecture of a representative embodiment of the present invention may be used by customers of wireless service providers and mobile station manufacturers, and/or vendors of wireless mobile handsets (i.e., phones) to develop their own data exchange applications.

Aspects of the present invention may be seen in a handheld electronic device supporting management of personal digital data. The handheld electronic device may comprise memory for storing operating code, device parameters, and personal digital data. Such a device may also comprise a data communication interface adapted for the exchange of messages with a second device, and a controller operably coupled to the data communication interface and the memory. The controller may be adapted to execute the operating code of the handheld electronic device. The operating code may be executable to process a set of enhanced AT commands that support management of the personal digital data via the data communication interface, and the enhanced AT commands may be compatible with the European Telecommunication Standards Institute (ETSI) TS 100 916 v7.5.0 (1999-12) or subsequent Technical Specification.

In a representative embodiment of the present invention, management may comprise uploading personal digital data to the second device, and may comprise downloading personal digital data from the second device. Management may also comprise deleting personal digital data from the handheld electronic device, and providing, to the second electronic device, metadata about personal digital data stored on the handheld electronic device. In various representative embodiment of the present invention, personal digital data may comprise at least one of the following: a digital image, a ring tone, address book information, calendar information, and call record information, and the handheld electronic device may comprise one of the following: a cellular telephone, a personal digital assistant, and a pager.

In a representative embodiment of the present invention, the data communication interface may communicate using a wireless communication protocol, and the wireless communication protocol may comprises one of an infrared signaling protocol, a Bluetooth compatible communication protocol, and an Institute of Electrical and Electronics Engineers (IEEE) 802.11a/b/g or n protocol. The data communication interface may also communicate using a wired communication protocol, and may use a serial communication protocol. The second device may comprise a personal computer.

Other aspects of the present invention may be found in a method of managing personal digital data in a handheld electronic device from a second electronic device. Such a method may comprise receiving, by client code in the handheld electronic device, a message from the second electronic device, and detecting presence of an enhanced AT command in the message. The method may also comprise parsing the enhanced AT command, and executing client code in the handheld electronic device based upon the parsed enhanced AT command. The client code may be adapted to support management of personal digital data on the handheld electronic device from the second electronic device. The set of enhanced AT commands may be compatible with and provide functionality beyond that provided by AT commands of the European Telecommunication Standards Institute (ETSI) TS 100 916 v7.5.0 (1999-12) or subsequent Technical Specification. In a representative embodiment in accordance with the present invention, management of personal digital data may comprise at least one of the following: the uploading of personal digital data to the second device, the downloading of personal digital data from the second device, the deletion of personal digital data from the handheld electronic device, and the making available to the second electronic device of metadata about personal digital data stored on the handheld electronic device.

In various representative embodiments of the present invention, the handheld electronic device may comprise one of the following: a cellular telephone, a personal digital assistant, and a pager. The personal digital data may comprise at least one of the following: a digital image, a ring tone, address book information, calendar information, and call record information. In some representative embodiments of the present invention, the receiving may be accomplished using a wireless communication link, and the wireless communication link may employ one of an infrared signaling protocol, a Bluetooth compatible communication protocol, and an Institute of Electrical and Electronics Engineers (IEEE) 802.11a/b/g or n protocol. In other representative embodiments, the receiving may be accomplished using a wired communication link, and the wired communication link may employ a serial communication protocol. A representative embodiment of the present invention may also comprise successfully authenticating the second electronic device prior to permitting management of personal digital data on the handheld electronic device. In addition, a representative embodiment of the present invention may comprise providing feedback to a user, employing a display on the handheld electronic device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A hand held electronic device supporting management of personal digital data, the handheld electronic device comprising:
   memory for storing operating code, device parameters, and personal digital data;
   a data communications interface adapted for the communication of messages with a second device;
   a controller operably coupled to the data communications interface and the memory, the controller adapted to execute the operating code of the handheld electronic device;
   wherein the operating code is executable to process a set of enhanced AT commands that support management of the personal digital data via the data communications interface;
   wherein the enhanced AT commands are compatible with and provide functionality beyond that provided by AT commands of the European Telecommunication Standards Institute (ETSI) TS 100 916 v7.5.0 (1999-12) Technical Specification; and
   wherein personal digital data comprises one or more of the following: a digital image, a ring tone, calendar information, and/or call record information.

2. The handheld electronic device according to claim 1, wherein management comprises uploading personal digital data to the second device.

3. The handheld electronic device according to claim 1, wherein management comprises downloading personal digital data from the second device.

4. The handheld electronic device according to claim 1, wherein management comprises deleting personal digital data from the handheld electronic device.

5. The handheld electronic device according to claim 1, wherein management comprises providing, to the second electronic device, metadata about personal digital data stored on the handheld electronic device.

6. The handheld electronic device according to claim 1, wherein the handheld electronic device comprises one of the following: a cellular telephone, a personal digital assistant, or a pager.

7. The handheld electronic device according to claim 1, wherein the data communications interface communicates using a wireless communication protocol.

8. The handheld electronic device according to claim 7, wherein the wireless communication protocol comprises one of an infrared signaling protocol, a Bluetooth compatible communication protocol, and an Institute of Electrical and Electronics Engineers (IEEE) 802.11a/b/g or n protocol.

9. The handheld electronic device according to claim 1, wherein the data communications interface communicates using a wired communication protocol.

10. The handheld electronic device according to claim 9, wherein the data communications interface uses a serial communication protocol.

11. The handheld electronic device according to claim 1, wherein the second device comprises a personal computer.

12. A method of managing personal digital data in a handheld electronic device from a second electronic device, the method comprising:

receiving, by client code in the handheld electronic device, a message from the second electronic device;

detecting presence of an enhanced AT command in the message, wherein the enhanced AT command is compatible with and provides functionality beyond that provided by AT commands of the European Telecommunication Standards Institute (ETSI) TS 100 916 v7.5.0 (1999-12) Technical Specification;

parsing the enhanced AT command;

executing client code in the handheld electronic device based upon the parsed enhanced AT command, the client code adapted to support management of personal digital data on the hand held electronic device from the second electronic device; and wherein personal digital data comprises one or more of the following: a digital image, a ring tone, calendar information, and/or call record information.

13. The method according to claim 12, wherein the management of personal digital data comprises one or more of the following: uploading of personal digital data to the second device, downloading of personal digital data from the second device, deletion of personal digital data from the handheld electronic device, and/or making available to the second electronic device metadata about personal digital data stored on the handheld electronic device.

14. The method according to claim 12, wherein the handheld electronic device comprises one of the following: a cellular telephone, a personal digital assistant, or a pager.

15. The method according to claim 12, wherein the receiving is accomplished using a wireless communication link.

16. The method according to claim 15, wherein the wireless communication link employs one of an infrared signaling protocol, a Bluetooth compatible communication protocol, and an Institute of Electrical and Electronics Engineers (IEEE) 802.11a/b/g or n protocol.

17. The method according to claim 12, wherein the receiving is accomplished using a wired communication link.

18. The method according to claim 17, wherein the wired communication link employs a serial communication protocol.

19. The method according to claim 12, further comprising: successfully authenticating the second electronic device prior to permitting management of personal digital data on the handheld electronic device.

20. The method according to claim 12, further comprising: providing feedback to a user, employing a display on the handheld electronic device.

21. A handheld electronic device supporting management of personal digital data, the handheld electronic device comprising:

a controller adapted to execute an operating code of the handheld electronic device;

wherein the operating code is executable to process a set of enhanced AT commands that support management of personal digital data via a data communications interface, wherein personal digital data comprises one or more of the following: a digital image, a ring tone, calendar information, and/or call record information; and wherein the enhanced AT commands are compatible with and provide functionality beyond that provided by AT commands of the European Telecommunication Standards Institute (ETSI) TS 100 916 v7.5.0 (1999-12) Technical Specification.

22. The handheld electronic device according to claim 21, wherein management comprises uploading personal digital data to the second device.

23. The handheld electronic device according to claim 21, wherein management comprises downloading personal digital data from the second device.

24. The handheld electronic device according to claim 21, wherein management comprises deleting personal digital data from the handheld electronic device.

25. The handheld electronic device according to claim 21, wherein management comprises providing, to the second electronic device, metadata about personal digital data stored on the hand held electronic device.

26. The handheld electronic device according to claim 21, wherein the handheld electronic device comprises one of the following: a cellular telephone, a personal digital assistant, or a pager.

27. The handheld electronic device according to claim 21, wherein the data communications interface communicates using a wireless communication protocol.

28. The handheld electronic device according to claim 27, wherein the wireless communication protocol comprises one of an infrared signaling protocol, a Bluetooth compatible communication protocol, and an Institute of Electrical and Electronics Engineers (IEEE) 802.11a/b/g or n protocol.

29. The handheld electronic device according to claim 21, wherein the data communications interface communicates using a wired communication protocol.

30. The handheld electronic device according to claim 29, wherein the data communications interface uses a serial communication protocol.

* * * * *

UNITED STATES PATENT AND TRADEMARK OFFICE
CERTIFICATE OF CORRECTION

PATENT NO.        : 7,650,164 B2                                            Page 1 of 1
APPLICATION NO.   : 11/224368
DATED             : January 19, 2010
INVENTOR(S)       : Nguyen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 529 days.

Signed and Sealed this

Twenty-third Day of November, 2010

David J. Kappos
*Director of the United States Patent and Trademark Office*